United States Patent [19]

Tsuchida et al.

[11] Patent Number: 5,372,408
[45] Date of Patent: Dec. 13, 1994

[54] MOTORCYCLE BRAKE SYSTEM HAVING DUAL MASTER CYLINDER PROPORTIONING

[75] Inventors: Tetsuo Tsuchida; Kanau Iwashita, both of Saitama; Yukimasa Nishimoto, Tokyo; Yoshiaki Sawano, Saitama, all of Japan

[73] Assignee: Honda Giken Kogyo Kabushiki Kaisha, Tokyo, Japan

[21] Appl. No.: 26,460

[22] Filed: Mar. 3, 1993

[30] Foreign Application Priority Data

| Mar. 6, 1992 | [JP] | Japan | 4-050032 |
| May 20, 1992 | [JP] | Japan | 4-127288 |
| May 28, 1992 | [JP] | Japan | 4-137104 |

[51] Int. Cl.⁵ ............................................. A62L 3/08
[52] U.S. Cl. ............................ 303/9.64; 303/9.61; 303/9.65
[58] Field of Search ............ 303/9.62, 9.64, 9.65, 303/9.61; 188/72.2

[56] References Cited

U.S. PATENT DOCUMENTS

| 3,159,729 | 12/1964 | Stelzer et al. | 303/9.65 |
| 3,459,588 | 8/1969 | Green et al. | 303/9.65 |
| 4,239,294 | 12/1980 | Burgdorf | 303/9.64 |
| 4,441,590 | 4/1984 | Giorgetti | 303/9.64 |
| 4,465,322 | 8/1984 | Hayashi | 303/9.64 |
| 4,494,800 | 1/1985 | Hayashi | 303/9.64 |
| 4,501,451 | 2/1985 | Reynolds et al. | 303/9.65 |
| 4,598,954 | 7/1986 | Hayashi | 303/9.64 |
| 4,626,038 | 12/1986 | Hayashi et al. | 303/9.64 |

FOREIGN PATENT DOCUMENTS

| 451555 | 10/1991 | European Pat. Off. | 303/9.64 |
| 2837963 | 3/1980 | Germany . | |
| 2917526 | 11/1980 | Germany . | |
| 1565736 | 5/1990 | U.S.S.R. | 303/9.65 |

*Primary Examiner*—Matthew C. Graham
*Attorney, Agent, or Firm*—Lyon & Lyon

[57] ABSTRACT

A brake apparatus for motorcycles with a master cylinder connected directly to a front wheel brake cylinder and connected through pressure control valves to a rear wheel brake cylinder. An adjustment varies the ratios of application of pressures to front and rear brakes through variation in valve spring settings to accommodate variations in load. A sensing system may be employed to determine application of braking force to the front wheel. This system may take the form of a mechanical servo mounting the front brake calipers, a direct pressure application in the master cylinder or a transducer measuring brake pressure to the front wheel. When braking to the front wheel is sensed above a selected threshold, the ratio of brake pressure of the front to rear wheels is reduced. A orifice restriction associated with the pressure control valves reduces sensitivity to variation in braking due to valve action.

21 Claims, 19 Drawing Sheets

MOTORCYCLE BRAKE SYSTEM HAVING DUAL MASTER CYLINDER PROPORTIONING

BACKGROUND OF THE INVENTION

The field of the present invention is control systems for hydraulic motorcycle brakes.

In a conventional motorcycle brake apparatus, a load sensor installed on an upper end of a rear cushion detects load on the motorcycle, based on which an oil pressure is generated. Based on the oil pressure, a characteristic of a pressure control valve is varied to automatically adjust brake force distribution between the front and rear wheels to increase or decrease a rear-wheel brake force as the live load increases or decreases according to, for example, the number of persons riding the motorcycle. Reference is made to Japanese Utility Model Laid-open No. Hei-3-122991. With the conventional motorcycle brake apparatus mentioned above, however, the brake force distribution characteristic between the front and rear wheels is determined unilaterally by the load, disallowing a rider to select a desired brake force distribution characteristic.

A conventional brake apparatus for motorcycles simultaneously generates braking force at a front-wheel brake section and a rear-wheel brake section through either or both a hand-operated lever-system brake and a foot-operated pedal-system brake. Reference is made to Japanese Patent Application Laid-open No. S56-154378. With the conventional constitution, the ratio of the brake force distribution to the front and rear wheels is generally characterized, with the lever-system brake section, by the rear-wheel brake force BFR gradually increasing as the front-wheel brake force BFF increases as indicated by the curve A in FIG. 22 and, with the pedal-system brake section, by the curve B in the same figure. In the case of simultaneously distribution of brake force to the front and rear wheels through the lever and pedal, initiating operation of the pedal while the lever is being operated adds a pedal-brake force to a lever-brake force. This combined operation results in a rapid rise from an operation start point $f_1$ as indicated by curve $B_1$. This characteristic operation makes a smooth brake operation difficult. In this case, a rising angle $\Theta$ equal to the rising angle $\Theta$ in a solo operation of the pedal is added to the rising angel of the curve A resulting from solo operation of the pedal.

A motorcycle brake apparatus is known in Japanese Utility Model Laid-open No. Hei-3-120286 which has a secondary master cylinder to be operated by a brake reaction force provided by a primary brake cylinder. Secondary brake cylinders are operated by brake oil pressure provided by the secondary master cylinder. A primary master cylinder is operated by a brake operator. An auxiliary oil path transmits a brake oil pressure from the primary master cylinder to the secondary master cylinder. A valve which opens or closes the auxiliary oil path to select either brake oil pressure generated by the secondary master cylinder or brake oil pressure generated by the primary master cylinder transmits the selected brake oil pressure to the secondary brake cylinders. If the brake oil pressure generated by the primary master cylinder is greater than that generated by the secondary master cylinder, the pressure from the primary master cylinder is transmitted from the auxiliary oil path through the secondary master cylinder to the secondary brake cylinders. If the brake oil pressure generated by the secondary master cylinder is greater than that generated by the primary master cylinder, the pressure from the secondary master cylinder is transmitted to the secondary brake cylinders by closing the auxiliary oil path. However, if the brake oil pressure generated by the primary master cylinder is roughly the same as the brake oil pressure generated by the secondary master cylinder, the pressure selector valve may intermittently open and close at short intervals.

SUMMARY OF THE INVENTION

The present invention is directed to control systems for improving the braking response of motorcycle brake systems having interactive front and rear brake controls.

In a first aspect of the present invention, a motorcycle brake system with a master cylinder connected directly to a brake cylinder of the front wheel and connected through pressure control valves to a brake cylinder of the rear wheel includes an adjustment for varying characteristics of the pressure control valves. This allows adjusting of the characteristic of brake force distribution between front and rear wheels to a rider's liking without having to use load sensor as practiced on conventional motorcycle brake apparatus.

In a second aspect of the present invention, a first brake input providing braking pressure to both front and rear wheels is restrained such that it is applied in a ratio of rear brake force to front brake force which is less if a second brake input is already applied than if the first brake input is applied alone. As an additional aspect to this, only a pedal operated brake input is applied in such a reduced ratio. These provide a smooth and sufficient brake force on a rear wheel when a pedal brake is applied while a lever brake is operating in a brake apparatus having the lever and pedal brakes.

In yet another aspect of the present invention, a motorcycle brake apparatus comprises a secondary master cylinder to be operated by a brake reaction force provided by a primary brake cylinder, secondary brake cylinders to be operated by a brake oil pressure provided by the secondary master cylinder, a primary master cylinder to be operated by a brake operator, an auxiliary oil path to transmit a brake oil pressure from the primary master cylinder to the secondary master cylinder, and a valve which opens or closes the auxiliary oil path to select either a brake oil pressure generated by the secondary master cylinder or a brake oil pressure generated by the primary master cylinder to transmit the selected brake oil pressure to the secondary brake cylinders, with the above-mentioned auxiliary oil path provided with an orifice formed by narrowing down the flow-path sectional area. This may provide a motorcycle brake apparatus having a rider-favorable brake feeling without causing the pressure selection valve to fluctuate unnecessarily. By using an orifice formed by narrowing down the auxiliary oil path a reduction in brake feeling is avoided even if a valve provided in the auxiliary oil path between a first master cylinder and a second master cylinder intermittently vibrates when a brake oil pressure generated by the first master cylinder and a brake oil pressure generated by the second master cylinder compete with each other.

Therefore, it is an object of the present invention to provide improved control systems for motorcycle brakes. Other objects and aspects of the invention will become apparent from the following descriptions with reference to accompanying drawings.

DETAILED DESCRIPTION OF THE PREFERRED EMBODIMENTS

Figure 1:
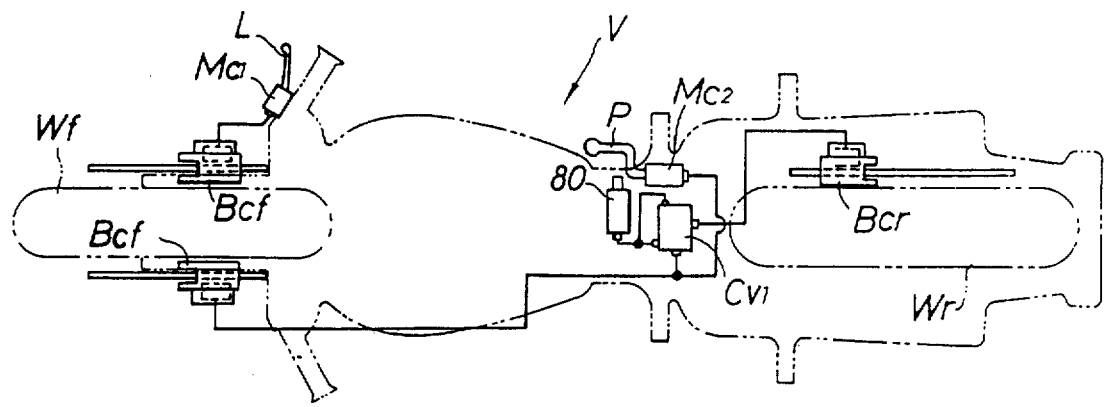
FIG. 1 is a top view of a motorcycle provided with a brake apparatus practiced as a first embodiment of an aspect of the present invention.
Figure 2:
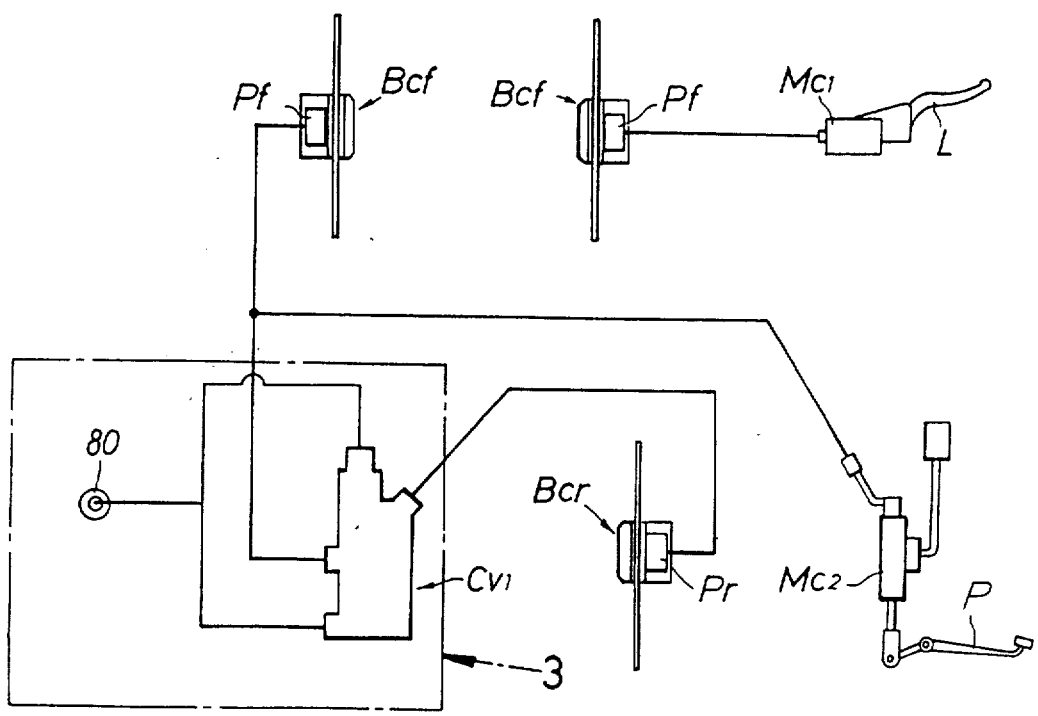
FIG. 2 is an overall block diagram of the brake apparatus of FIG. 1.

Referring to FIGS. 1 and 2, a motorcycle V has a brake lever L installed on a steering handle and a brake pedal P installed on a body frame. A front wheel Wf is provided with a right-side brake cylinder $B_{Cf}$ and a left-side brake cylinder $B_{Cf}$, each provided with a pot $P_f$. A first master cylinder $M_{C1}$ operated by the brake lever L is directly connected to the pot $P_f$ on the right-side brake cylinder $B_{Cf}$. A second master cylinder $M_{C2}$ operated by the brake pedal P is directly connected to the pot $P_f$ of the left-side brake cylinder $B_{Cf}$.

The second master cylinder $M_{C2}$ is connected through a pressure control valve $C_{V1}$ to one pot $P_r$ on a brake cylinder $B_{Cr}$ of a rear wheel Wr. The pressure control valve $C_{V1}$ is connected to adjusting means 80 for varying brake force distribution characteristics between the front and rear wheels according to the number of riders.

Figure 3:
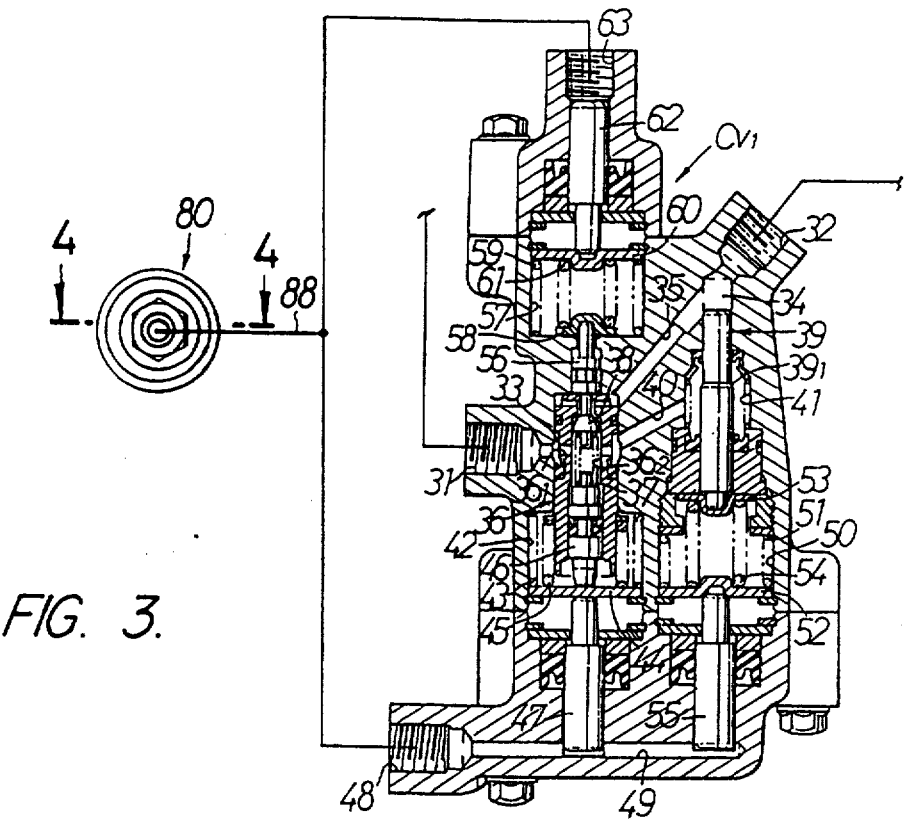
FIG. 3 is an enlarged sectional view of portion 3 of FIG. 2.

Referring to FIG. 3, the pressure control valve $C_{V1}$ is provided with an input port 31 connected to the second master cylinder $M_{C2}$ and an output port 32 connected to the pot $P_r$, on the brake cylinder $B_{Cr}$, of the rear wheel Wr. A valve chest 33 in communication with the input port 31 and an oil chamber 34 in communication with the output port 32 are in communication with each other through an oil path 35. In the valve chest 33, a cylindrical proportional valve is arranged in a vertically movable manner. In an inner chamber $36_2$ of the proportional valve 36 in communication with the input port 31 through an oil hole $36_1$, a cut valve 38 is installed which is pressed by a valve spring 37 in a valve closing direction. When the cut valve 38 is at a valve opening position as shown, the input port 31 is in communication with the output port 32 through the oil hole $36_1$, the inner chamber $36_2$, a periphery of the cut valve 38, the oil path 35, and the oil chamber 34. The pressure control valve $C_{V1}$ is further provided with a pressure reducing valve 39. A top of the pressure reducing valve 39 meets the oil chamber 34. A shoulder $39_1$ formed in a middle of this valve is arranged in a valve chest 41 which is in communication with the valve chest 33 through an oil path 40.

A spring chamber 42 installed under the valve chest 33 is internally provided with a spring seat 44 pressed downward by a return spring 43. Between the spring seat 44 and the proportional valve 36, a valve spring 45 is compressedly installed. An auxiliary valve body 46 is slidably fit in the inner chamber $36_2$ of the proportional valve 36 to abut at its lower end on the spring seat 44 and support at its upper end the valve spring 37 which presses the cut valve 38. A sensing valve 47 is supported in a vertically movable manner at a bottom of the spring chamber 42 to abut at its upper end on an underside of the spring seat 44 and protrude at its lower end into an oil chamber 49 which is in communication through an input port 48 with the adjusting means 80 to be described later.

A spring chamber 50 is formed at a bottom of the pressure reducing valve 39. A spring seat 52 pressed downward by a return spring 51 is installed inside the spring chamber 50. A valve spring 54 is compressedly installed between the spring seat 52 and a spring seat 53 which supports the lower end of the pressure reducing valve. A sensing valve 55 supported in a vertically movable manner at the bottom of the above-mentioned spring chamber 50 abuts at its top on the underside of the spring seat 52 and protrudes at its lower end into the oil chamber 49.

An auxiliary valve body 56 is installed in a vertically movable manner in the valve chest 33 at its upper portion to abut on the top of the cut valve 38, thereby opening this cut valve forcibly. The auxiliary valve body 56 abuts at its upper end on a spring seat 58 installed inside in spring chamber 57. A valve spring 61 is compressedly installed between the spring seat 58 and a spring seat 60 pressed upward by a return spring 59. A sensing valve 62 is supported in a vertically movable manner in the upper portion of the spring chamber 57 to abut at its lower end on the upper side of the spring seat 60 and protrude at its upper end into an input port 63 which is in communication with the adjusting means 80.

Figure 4:
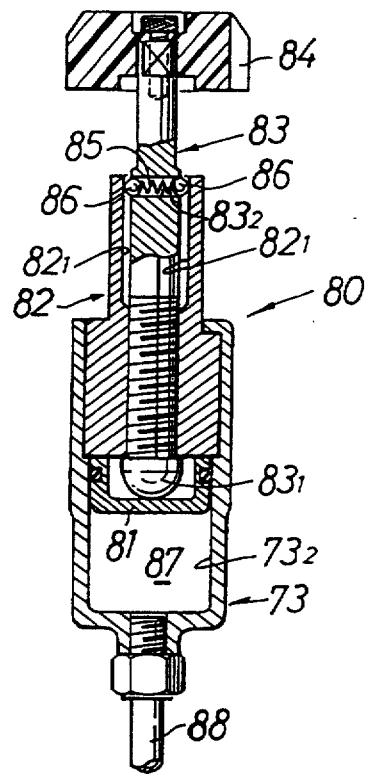
FIG. 4 is a cross-sectional view at line 4—4 of FIG. 3.

As clearly seen in FIG. 4 in addition to FIG. 3, the adjusting means 80 is provided with a cylinder member 73 having a cylinder chamber $73_2$ which is slidably fitted with a piston 81. The open end is blocked by a cap 83 fixedly secured by caulking. An adjustment rod 83 threadedly engaged with the cap 82 at its center has at its top a pressing portion $83_1$ abutting on a rear side of the piston 81 and, at its base, an operation member 84. A ball holding hole $83_2$ radially passing the adjustment rod 83 contains two balls 86 radially pressed outside by a spring 85. Engaging these two balls 86 with a plurality of grooves $82_1$ axially formed in an inner face of the cap 82 provides discrete stop positions for the adjustment rod 83 appropriately for every predetermined angle. Thus, turning the operation member 84 to move the adjust slot 83 toward or away from the cap 82 moves the piston 81 abutting on the pressing portion $83_1$ back and forth to vary the volume of a pressure adjusting chamber 87 formed by the cylinder hole $73_2$ and a piston 81.

Operating the brake lever L transmits a brake oil pressure generated by the first master cylinder $M_{C1}$ to the pot $P_f$ on the right-side brake cylinder $B_{Cr}$ of the front wheel Wf to brake it. Operating the brake pedal P transmits a brake oil pressure generated by the second master cylinder $M_{C2}$ to the pot $P_f$ on the left-side brake cylinder $B_{Cr}$ of the front wheel Wf.

The brake oil pressure generated by the second master cylinder $M_{C2}$ upon operating the brake pedal P is transmitted not only to the pot $P_f$ on the left-side brake cylinder $B_{Cf}$ of the front wheel Wf but also to the pot $P_r$ on the brake cylinder $B_{Cr}$ of the rear wheel Wr through the pressure control valve $C_{v1}$. While the brake oil pressure generated by the second master cylinder $M_{C2}$ is low, the brake oil pressure is transmitted from the input port 31 through the oil hole $36_1$ and inner chamber $36_2$ of the proportional valve 36, the periphery of the cut valve 38, the oil paths 35 and 34, and the output port 32 to the pot $P_r$, on the brake cylinder $B_{Cr}$ of the rear wheel Wr without change. Consequently, when the brake pedal P is operated with a weak pressing force, the brake forces of the front wheel Wf and the rear wheel Wr will increase according to the strength of that force, presenting a brake force distribution characteristic indicated by a curve between point O and point A in FIG. 5.

Figure 5:
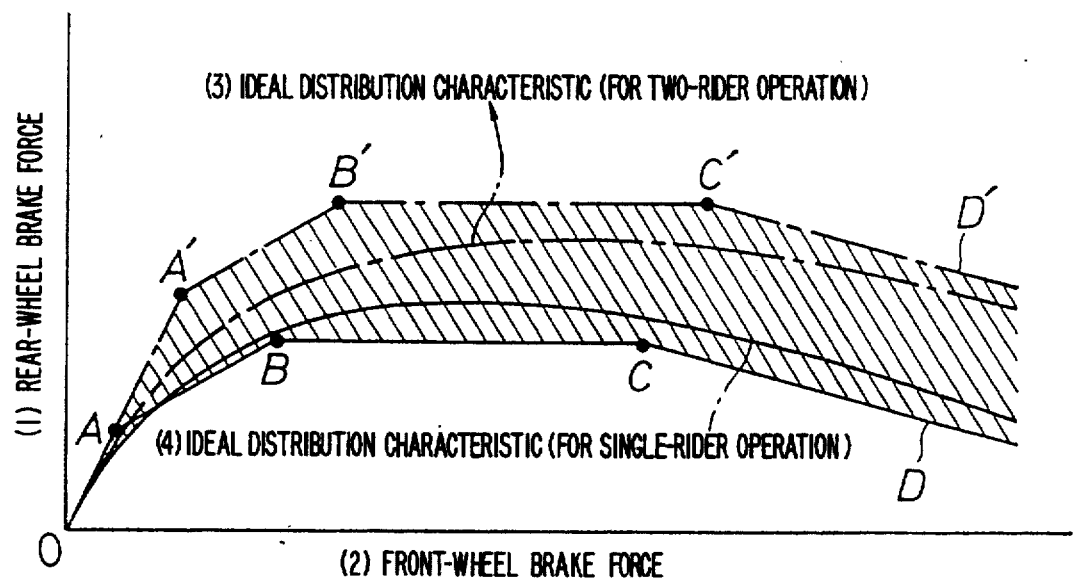
FIG. 5 is a graph showing brake characteristics.

As the pressing force applied to the pedal P increases, the brake oil pressure to be transmitted to the input port 31 of the pressure control valve $C_{v1}$ further increases; when the brake force of the rear wheel Wr has reached point A in FIG. 5, the proportional valve 36 is lowered by the brake oil pressure acting on its upper face against a setting load applied by the valve spring 45. As a result, the proportional valve touches the cut valve 38 to temporarily block the communication between the input port 31 and the output port 32. When the brake oil pressure to be transmitted to the input port 31 further increases, pressure inside the inner chamber $36_2$ of the proportional valve 36 increases to push up the proportional valve 36, unblocking the communication between the input port 31 and the output port 32. Thus, with further increase of the brake oil pressure, the proportional valve 36 vibrates up and down to intermittently open and close the gap between the proportional valve 36 and the cut valve 38, thereby reducing the proportion of brake oil pressure to be transmitted to the brake cylinder $B_{Cr}$ of the rear wheel Wr. As a result, the ratio of brake force on the rear wheel Wr to brake force on the front wheel Wf contributed by the left-side brake cylinder $B_{Cf}$ will be reduced beyond point A in FIG. 5.

When the brake oil pressure to be transmitted to the input port 31 of the pressure control valve $C_{v1}$ further increases to make the braking force on the rear wheel Wr reach point B in FIG. 5, the auxiliary valve body 56 goes up against the setting load of the valve spring 61 to raise the cut valve 38 pressed by the valve spring 37, making the cut valve 38 touch the proportional valve 36. This completely blocks the communication between the input port 31 and the output port 32. Under this condition, if the brake oil pressure to be transmitted to the input port 31 increases thereafter, the brake oil pressure to be transmitted from the output port 32 to the brake cylinder $B_{Cr}$, is maintained at a constant level.

When the brake oil pressure to be transmitted to the input port 31 of the pressure control valve $C_{v1}$ further increases to make the brake force on the rear wheel Wr reach point C in FIG. 5, the brake oil pressure is transmitted through the oil path 40 to the oil chamber 41. This lowers the pressure reducing valve 39 against the setting load of the valve spring 54. Consequently, the top of the pressure reducing valve 39 goes down to increase the volume of the oil chamber 34, reducing the brake oil pressure to be transmitted to the brake cylinder $B_{Cr}$.

Thus, in four steps the action of the pressure control valve $C_{v1}$ changes, the oil pressure to be transmitted to the brake cylinder BCr of the rear wheel Wr, or the brake force on the rear wheel Wr. The distribution characteristic between the brake forces on the front wheel Wf and the rear wheel Wr varies as indicated by the curve O-A-B-C-D of FIG. 5. This provides a distribution characteristic very similar to an ideal distribution characteristic for a single-rider operation.

When the operation member 84 of the adjusting means 80 is operated to move the piston 81 forward along with adjustment bolt 83 to forcibly reduce the volume of the pressure adjusting chamber 87, a control oil pressure generated in this chamber is transmitted through the input port 48 to the oil chamber 49 of the pressure control valve $C_{v1}$ to push up the two sensing valves 47 and 55. This leads to an increase in the setting loads of the valve spring 45 pressing the proportional valve 36 and the valve spring 54 pressing the pressure reducing valve 39. Likewise, the control oil pressure is transmitted to the input port 63 to push down the sensing valve 62, increasing the setting load of the valve spring 61 pressing the auxiliary valve body 56.

As described above, when the setting loads of the valve springs 42, 53, and 61, respectively pressing the proportional valve 36, the cut valve 38, and the pressure reducing valve 39, are increased, the operation of these three valves 36, 38, and 39 occur at higher pressures, or points A through C in FIG. 5 shift to the right. This changes the characteristic of the brake force distribution between the front wheel Wf and the rear wheel Wr to one represented by the dashed curve passing points A' through D'. Consequently, a proper characteristic can be obtained by increasing the ratio of the brake force on the rear wheel Wr such that it adapts to an ideal distribution characteristic for a two-rider operation. Thus, operating the pressure adjusting means 80 allows the rider to freely adjust the brake force distribution characteristic between the front wheel Wf and the rear wheel Wr in the hatched area in FIG. 5 which represents the ideal distribution characteristics for single-rider and two-rider operations, thereby providing a rider-controlled brake force distribution characteristic.

Figure 6:
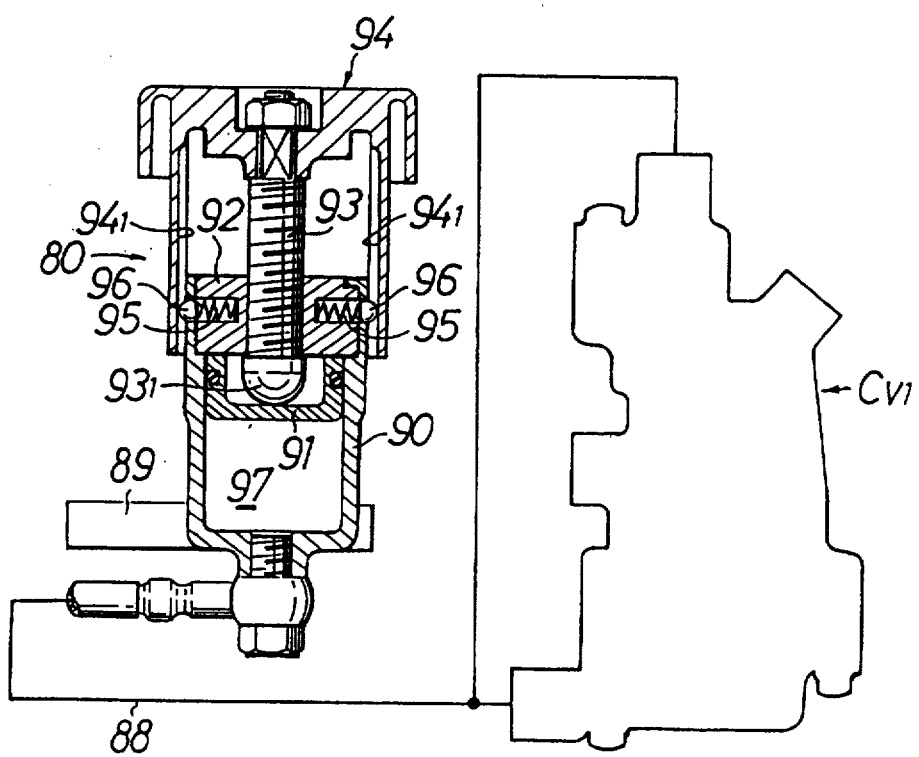
FIG. 6 is a diagram equivalent to FIG. 4 in a variation of the first embodiment.

FIG. 6 shows a variation of the first embodiment. In this variation, the adjusting means 80 comprises a cylinder 90 supported at a proper position of the body frame through a bracket 89, a piston 91 slidably engaged with the cylinder 90, a cap 92 fixedly secured by caulking on the cylinder 90 at its open end, an adjustment rod 93 threadedly engaged with the cap 92 at its center to abut on a rear side of the piston 90, and an operation member 94 fixedly secured to the adjust rod 93 at its base to fit the cap 92 around its periphery. The cap 92 is provided with balls 96 that fit in a plurality of ball grooves $94_1$ axially formed inside the operation member 94, these balls 96 being radially pressed outside by springs 95.

With this exemplary variation, rotating the operation member 94 to move the piston 91 back and forth by the adjustment rod 93 also allows variation in the volumes of a pressure adjusting chamber 97 and to increase or decrease the control oil pressure to be transmitted to the pressure control valve $C_{v1}$, thereby freely adjusting the brake force distribution characteristic.

Figure 7:
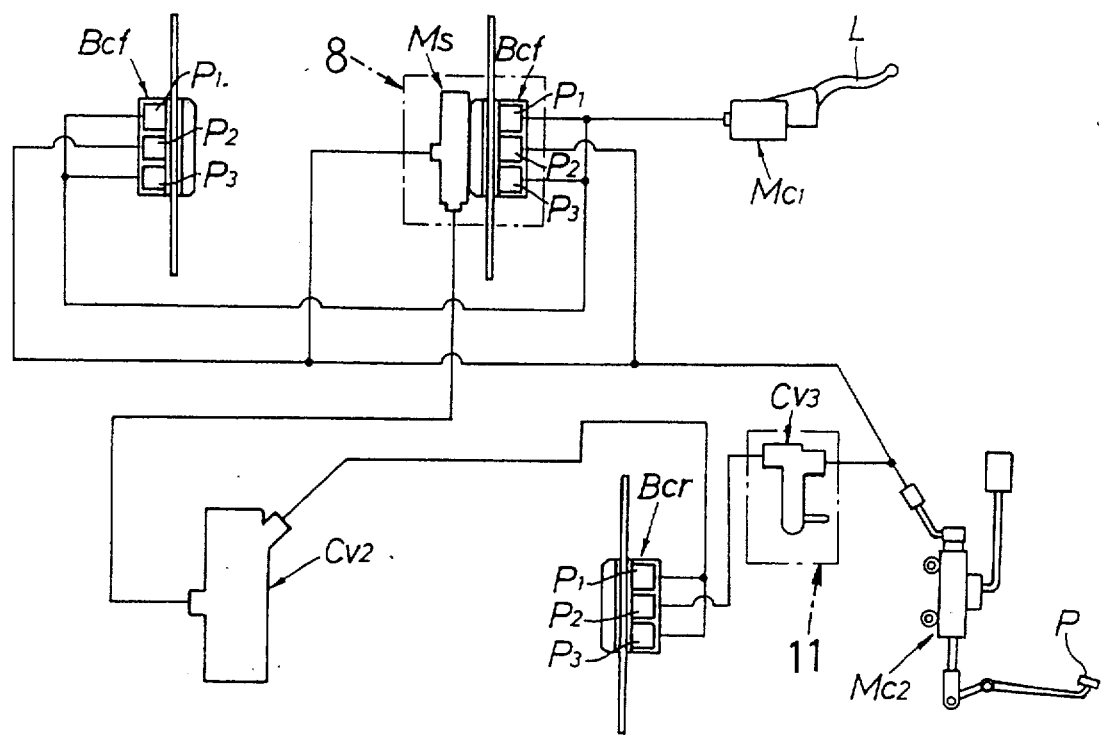
FIG. 7 is an overall block diagram of a brake apparatus practiced as a second embodiment of an aspect of the present invention.

FIGS. 7 through 12 show a second embodiment. Referring to FIG. 7, a first master cylinder $M_{C1}$ to be operated by a brake lever L installed on a steering handle is directly connected to a front pot $P_1$ and a rear pot $P_3$ of right and left-side brake cylinders $B_{Cf}$ and $B_{Cf}$ of a front wheel, each having three pots $P_1$ $P_2$, and $P_3$. A second master cylinder $M_{C2}$ to be operated by a brake pedal P is directly connected to the center pot $P_2$ on each of the right and left-side brake cylinders $B_{Cf}$ and $B_{Cf}$ of the front wheel Wf. The right-side brake cylinder $B_{Cf}$ of the front wheel Wf is provided with a mechanical servo Ms which generates a brake oil pressure and transmits it through a pressure control valve $C_{V2}$ to a front pot $P_1$ and a rear pot $P_3$ on a brake cylinder $B_{Cr}$ of a rear wheel Wr having three pots $P_1$, $P_2$, and $P_3$. The above-mentioned second master cylinder $M_{C2}$ is also connected to the mechanical servo Ms and to the center pot $P_2$ on the brake cylinder $B_{Cr}$ of the rear wheel Wr through a pressure control valve $C_{V3}$.

Figure 8:
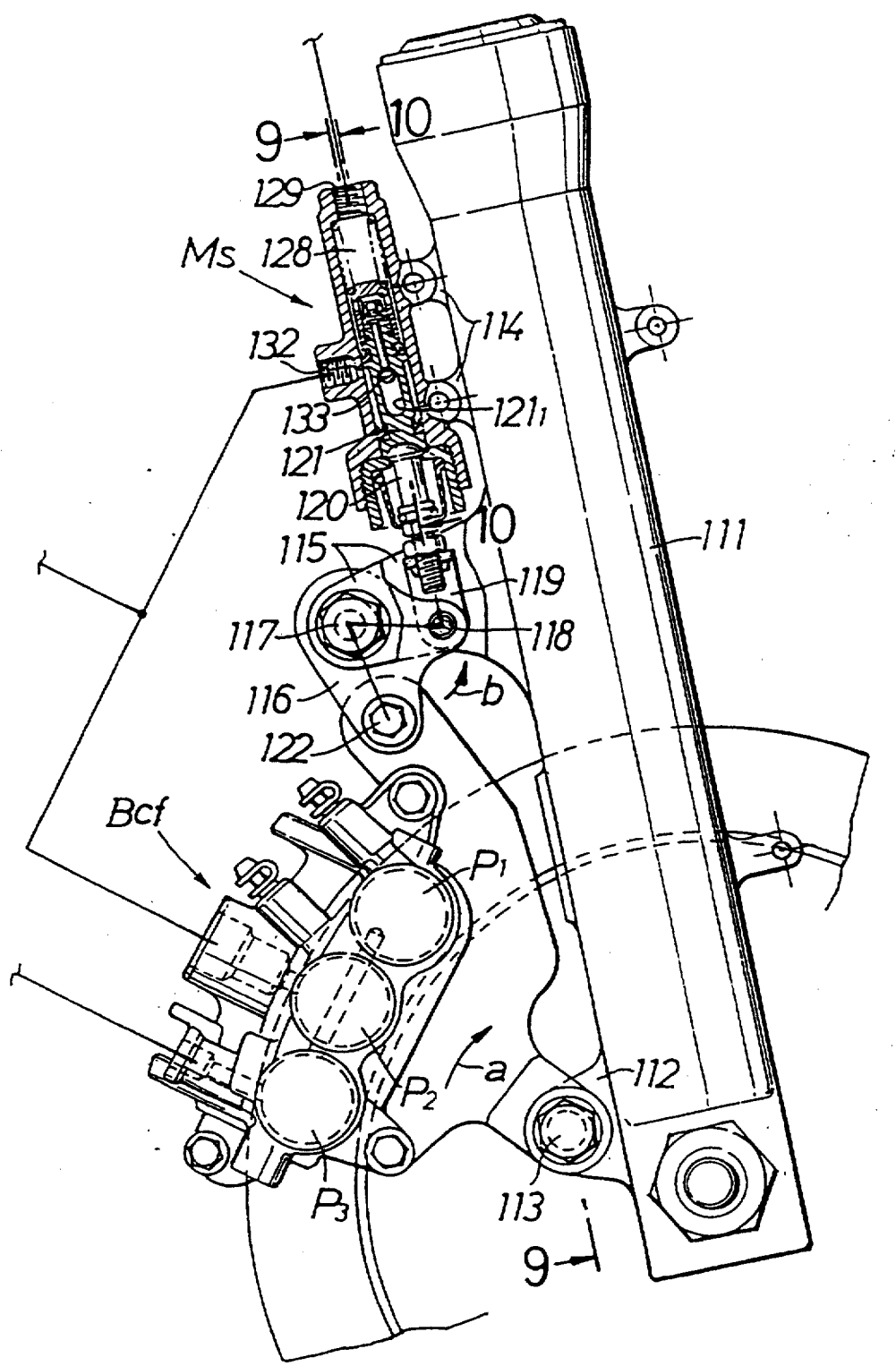
FIG. 8 is an enlarged diagram of portion 8 of FIG. 7.
Figure 9:
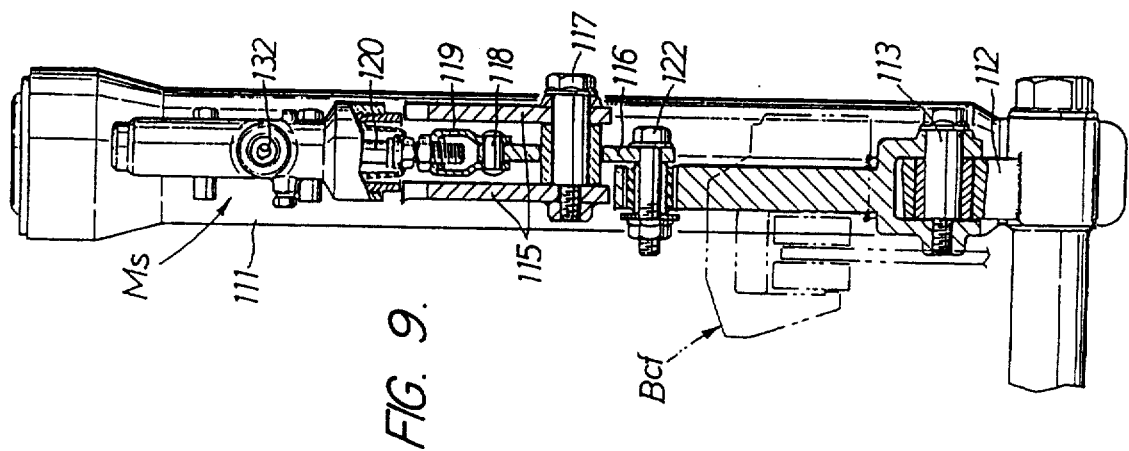
FIG. 9 is a cross-sectional view at line 9—9 of FIG. 8.
Figure 12:
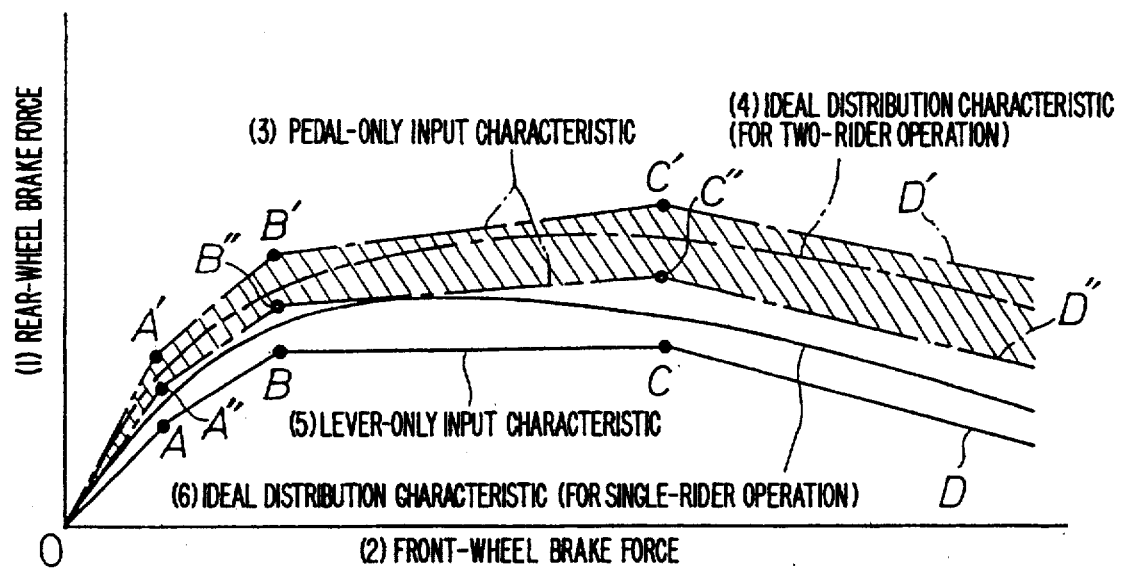
FIG. 12 is a graph showing brake characteristics.

Referring to FIGS. 8 and 9, the right-side brake cylinder $B_{Cf}$ of the front wheel Wf is swingably pivoted through a pin 113 to a bracket 112 fixedly secured on the bottom of a front fork 111. The approximately cylindrical mechanical servo Ms is longitudinally supported by the front fork 111 at its upper portion along its rear side through a pair of brackets 114. On a bracket 115 fixedly secured to the front fork 111, an L-shaped link 116 is swingably pivoted through a pin 117. A rod 120 unitized with a link member 119 pivotally secured to one end of the link 116 through a pin 118 abuts at its top on a lower end of a piston 121 of the above-mentioned mechanical servo Ms. The above-mentioned link 116 is also pivotally secured at another end to the top of the above-mentioned brake cylinder $B_{cf}$ through a pin 122. Consequently, when the front wheel Wf is braked, the brake cylinder Bcf moves in the direction of arrow a and the link 116 moves in the direction of arrow b to push up the rod 120. This makes the mechanical servo Ms generate a secondary brake oil pressure.

Figure 10:
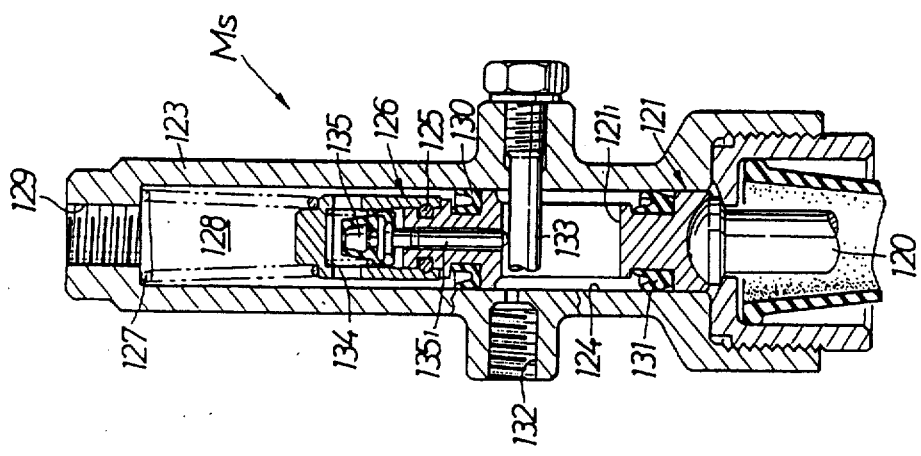
FIG. 10 is a cross-sectional view at line 10—10 of FIG. 8.

As clearly seen from FIG. 10, a cylinder section 124 is formed in a casing 123 of the mechanical servo Ms. The piston 121 slidably fitting inside the cylinder section 124 is connected at its top with a valve guide 126 through an O-ring 125. The cylinder section 124 is formed at its upper portion with an oil chamber 128 to accommodate a return spring 127 for pressing down the above-mentioned valve guide 126 and the piston 121. The oil chamber 128 is formed at its top with an output port 129.

The piston 121 is provided at its front end with a primary cup 130 and at its rear end with a secondary cup 131. The casing 123 is formed between the cups 130 and 131 with a secondary port 132 connecting to the above-mentioned second master cylinder $M_{C2}$. The piston 121 is formed at its middle with a long groove $121_1$ diametrically penetrating it. A stopper bolt 133 threaded in the casing 123 is slidably and engaged with the long groove $121_1$.

The valve guide 126 is loosely accommodated internally with a valve 135 biased by a valve spring 134 in a direction to abut on the top of the piston 121 to close the passage therethrough. The valve 135 is integrally formed with a leg $135_1$ which centrally penetrates the piston 121 into the long groove $121_1$ to abut on the above-mentioned stopper bolt 133. While the piston 121 is pressed by the return spring 127 back to a position shown in FIG. 10, the above-mentioned leg $135_1$ of the valve 135 abuts on the stopper bolt to be pushed up, providing communication between the secondary port 132 and the oil chamber 128 through a gap around the valve 135 and the leg $135_1$. This allows transmission of the brake oil pressure to the front pot $P_1$ and the rear pot $P_3$ on the brake cylinder $B_{Cr}$ of the rear wheel Wr through the pressure control valve $C_{V2}$ upon pressing the brake pedal P even when the motorcycle is stopped, thus facilitating a slope start. When the mechanical servo Ms operates in this state to push up the piston 121 through the rod 120 slightly, the leg $135_1$ of the valve 135 detaches from the stopper bolt 133 to make the valve spring 134 press the valve body 135 down, blocking the communication between the secondary port 132 and the oil chamber 128. Consequently, when the piston 121 further moves upwardly, the oil chamber 128 generates a brake oil pressure to be transmitted through the output port 129 to the left-side brake cylinder $B_{Cf}$ of the front wheel Wf and the pressure control valve $C_{V2}$. Thus, the action of the above-mentioned valve 135 allows elimination of a primary port heretofore required, avoiding the problem of potential damage to the primary cup 130 when passing the primary port.

Figure 11:
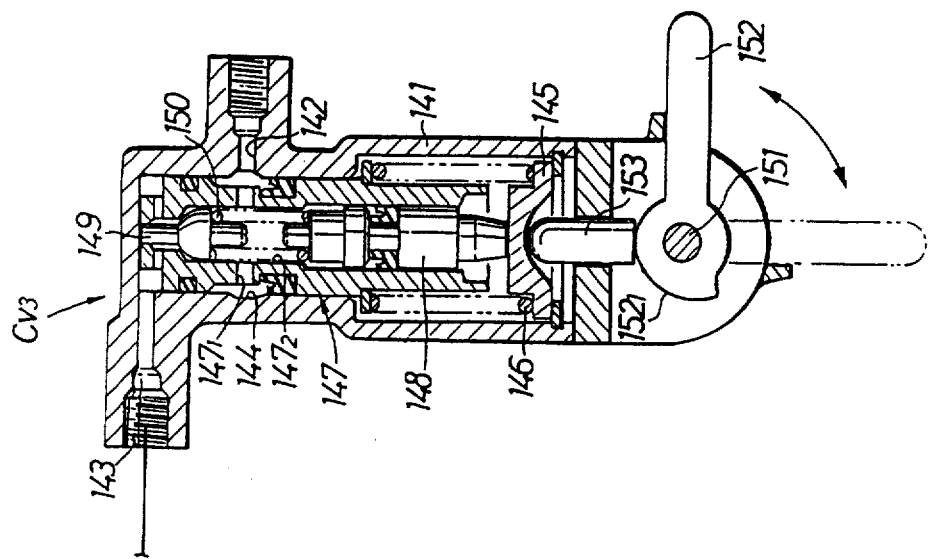
FIG. 11 is an enlarged diagram of portion 11 of FIG. 7.

FIG. 11 shows the pressure control valve $C_{V3}$. The casing 141 of the pressure control valve $C_{V3}$ includes an input port 142 through which brake oil pressure from the second master cylinder $M_{C2}$ is supplied and an output port 143 connecting to the center pot $P_2$ on the brake cylinder $B_{Cr}$ of the rear wheel Wr. Further, a valve chest 144 formed inside the casing 141 is internally formed with a cylindrical proportional valve 147 arranged in a vertically movable manner and pressed upward by a valve spring 146 in compression between a spring seat 145 and the proportional valve 147. An inner chamber $147_2$ in communication with the input port 142 through an oil hole $147_1$ is internally arranged with an auxiliary valve body 148 abutting at its lower end on the above-mentioned spring seat 145 and a cut valve 149. The cut valve 149 is pressed in a direction of valve closure by a valve spring 150 in compression installed between the auxiliary valve body 148 and the cut valve 149.

A lever 152 as adjusting means pivotally secured on the casing 141 at its lower end through a pin 151 is provided with a cam face $152_1$ abutting on the above-mentioned spring seat 145 through a push rod 153 slidably supported by the casing 141. Consequently, rotating the lever 152 to the position illustrated in phantom pushes up the push rod 153 at the cam face $152_1$, increasing setting loads of the valve spring 146 and valve spring 150. Conversely, rotating the lever 152 to the position indicated in solid line pushes down the push rod 153, decreasing the setting loads of the valve spring 146 and valve spring 150.

Normally, the proportional valve 147 and the cut valve 149 are at the valve open position as shown. The input port 142 is in communication with the output port 143 through the above-mentioned oil hole $147_1$, the inner chamber $147_2$, and a periphery of the cut valve 149. When the brake oil pressure to be transmitted from the second master cylinder $M_{C2}$ to the input port 142 gradually increases, the brake oil pressure acting on the proportional valve 147 at its upper face presses down the proportional valve 147 against the setting load of the valve spring 146 to make the proportional valve 147 firmly contact the cut valve, temporarily blocking the communication between the input port 142 and the output port 147. However, when the brake oil pressure to be transmitted to the input port 142 further increases, pressure in the inner chamber $147_1$ of the proportional valve 147 pushes up this valve, restoring communication between the input port 142 and the output port 143. Thus, as the brake oil pressure increases, the proportional valve 147 vertically oscillates to intermittently open and close the gap between the proportional valve 147 and the cut valve 149. Accordingly, when the brake oil pressure to be transmitted to the brake cylinder $B_{Cr}$ of the rear wheel Wr has reached a predetermined level, the ratio of brake oil pressure on the pot $P_2$ of the rear brake cylinder $B_{cr}$ to brake oil pressure on the pots $P_2$ of the front brake cylinders $B_{cf}$ is lowered to a predetermined ratio.

When the lever 152 is rotated to the position indicated in phantom, the setting loads of the valve springs 146 and 150 increase to vary the pressure reducing characteristic of the pressure control valve $C_{V3}$ in a reducing direction. When the lever 152 is rotated to the position indicated by the solid line, the setting loads of the valve springs 146 and 150 decrease to vary the pressure reducing characteristic of the pressure control valve $C_{V3}$ in an increasing direction.

It should be noted that, although the pressure control valve $C_{V2}$ used in this second embodiment is basically the same as the pressure control valve $C_{V1}$ used in the above-mentioned first embodiment in construction, the pressure control valve $C_{V2}$ in this second embodiment is not provided with the adjusting means 80, thereby eliminating the three sensing valves 47, 55, and 62.

When the brake lever L alone is operated, the brake oil pressure generated by the first master cylinder $M_{C1}$ is transmitted to the front and rear pots $P_1$ and $P_2$ on the right and left-side brake cylinders $B_{Cf}$ and $B_{Cf}$ of the front wheel Wf to brake the front wheel Wf. The secondary brake oil pressure generated by the mechanical servo Ms upon braking of the front wheel Wf is transmitted through the pressure control valve $C_{V2}$ to the front and rear pots $P_1$ and $P_3$ on the brake cylinder $B_{Cr}$ of the rear wheel Wr to brake the rear wheel Wr. At this point of time, when the secondary brake oil pressure to be transmitted from the mechanical servo Ms to the pressure control valve $C_{V2}$ gradually increases along with an increase in the brake force of the front wheel Wf, the proportional valve 36, the cut valve 38, and the pressure reducing piston 39 arranged in the pressure control valve $C_{V2}$ operate sequentially, providing a brake characteristic indicated by a line O-A-B-C-D shown in FIG. 12. This brake characteristic to be presented when the brake lever L alone has been operated is set under and along an ideal single-rider brake force distribution characteristic curve.

On the other hand, when the brake pedal P alone is operated, the brake oil pressure generated by the second master cylinder $M_{C2}$ is transmitted to the center pot $P_2$ on the right and left-side brake cylinders $B_{Cf}$ and $B_{Cf}$ of the front wheel Wf to brake the front wheel Wf. The secondary brake oil pressure generated by the mechanical servo Ms upon braking of the front wheel Wf is transmitted through the pressure control valve $C_{V2}$ to the front and rear pots $P_1$ and $P_2$ on the brake cylinder $B_{Cr}$ of the rear wheel Wr to simultaneously brake the rear wheel Wr. If the brake oil pressure generated by the second master cylinder $M_{C2}$ is greater than that generated by the above-mentioned mechanical servo, the brake oil pressure generated by the second master cylinder $M_{C2}$ is directly transmitted to the pressure control valve $M_{V2}$ to brake the rear wheel Wr. In either case, as the brake oil pressure to be transmitted from the mechanical servo Ms to the pressure control valve $C_{V2}$ increases, the proportional valve 36, the cut valve 38, and the pressure reducing piston 39 arranged in the pressure control valve $C_{V2}$ sequentially operate to restrain an increase in the brake force on the rear wheel Wr.

When the brake pedal P is operated, the brake oil pressure generated by the second master cylinder $M_{C2}$ is also transmitted through the pressure control valve $C_{V3}$ to the center pot $P_2$ on the brake cylinder $B_{Cr}$ of the rear wheel Wr to add a brake force generated by the center pot $P_2$ to that generated by the above-mentioned front and rear pots $P_1$ and $P_3$, resulting in an increase in the brake force on the rear wheel Wr. A magnitude of an additional brake force applied by the brake pedal P to the rear wheel Wr is determined by a magnitude of the brake oil pressure outputted by the pressure control valve $C_{V3}$. That is, because the brake oil pressure outputted by the pressure control valve $C_{V3}$ provides a characteristic which gradually increases with pressure on the brake pedal P, a brake force distribution characteristic curve presented in a solo operation of the brake pedal P as indicated by the curve O-A'-B'-C'-D' or D-A"-B"-C"-D" shown in FIG. 12 replaces the brake force distribution characteristic curve presented in a solo operation of the brake lever L as indicated by the line O-A-B-C-D, with the difference therebetween gradually increasing.

It should be noted that the characteristic O-A'-B'-C'-D' corresponds to a situation in which the lever 152 of the pressure control valve $C_{V3}$ is at the position indicated in phantom in FIG. 11 and the pressure reduction characteristic is low. The characteristic O-A"-B"-C"-D" corresponds to a situation in which the lever 152 is at the position indicated by the solid line and the pressure reduction characteristic is high. Therefore, moving the lever 152 of the pressure control valve $C_{V3}$ between the positions respectively indicated by the phantom line and solid line in FIG. 11 in the solo operation of the brake pedal P allows adjustment to the pressure reduction characteristic of the pressure control valve $C_{V3}$ to freely vary the brake force distribution characteristic between the front and rear wheels inside the hatched area in FIG. 12, providing the distribution characteristic desired by rider. For example, if, in a solo operation of the brake pedal P in a single-rider operation, the brake force distribution characteristic presents the curve O-A'-B'-C'-D' to greatly depart from the ideal single-rider distribution characteristic curve, swinging the lever 152 to the solid-line indicated position provides the curve O-A',-B''-C''-D'', coming closer to the ideal distribution characteristic of the single-rider operation.

Figure 13:
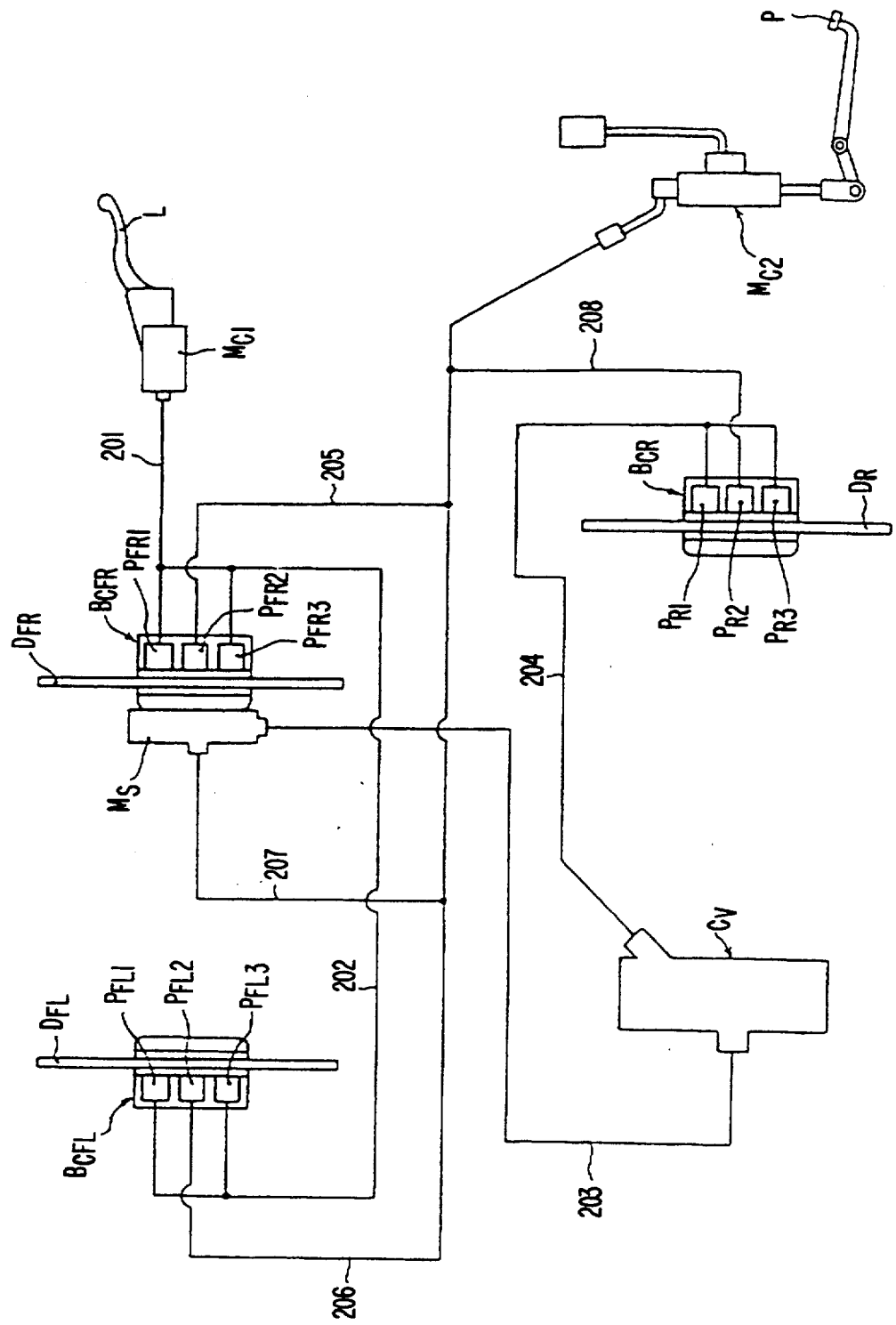
FIG. 13 is a schematic diagram of a third embodiment of an aspect of the present invention.

FIG. 13 through FIG. 18 show a third embodiment. Referring to FIG. 13, $D_{FR}$ and $D_{FL}$ respectively represent a right-side brake disk and a left-side brake disk of a front wheel and $D_R$ represents a brake disk of a rear wheel. Brake calipers $B_{CFR}$, $B_{CFL}$, and $B_{CR}$ are operatively provided on these brake disks, respectively. A master cylinder $M_{C1}$ operated by a hand-operated lever L is in communication through oil paths 201 and 202 with the front-wheel right-side brake caliper $B_{CRF}$ at pots $P_{FR1}$ and $P_{FR3}$ arranged on both sides and with the left-side brake caliper $B_{CFL}$ at pots $P_{FL1}$ and $P_{FL3}$ arranged on both sides.

A mechanical servo Ms is installed on the right-side brake caliper $B_{CFR}$. This mechanical servo is in communication at its output with a pressure control valve $C_V$, which serves as restraining means, and with the rear-wheel brake caliper $B_{CR}$ at pots $P_{R1}$ and $P_{R3}$ arranged on both sides through an oil path 204. A master cylinder $M_{C2}$ operated by a pedal P is in communication through oil paths 205 and 206 with the right-side and left-side brake calipers $B_{CFR}$ and $B_{CFL}$ at pots $P_{FR2}$ and $P_{FL2}$ arranged in the middle, respectively. At the same time, the master cylinder $M_{C2}$ is in communication through an oil path 207 with the mechanical servo Ms at its side port and through an oil path 208 with the rear-wheel brake caliper $B_{CR}$ at a pot $P_{R2}$ arranged in the middle.

Figure 14:
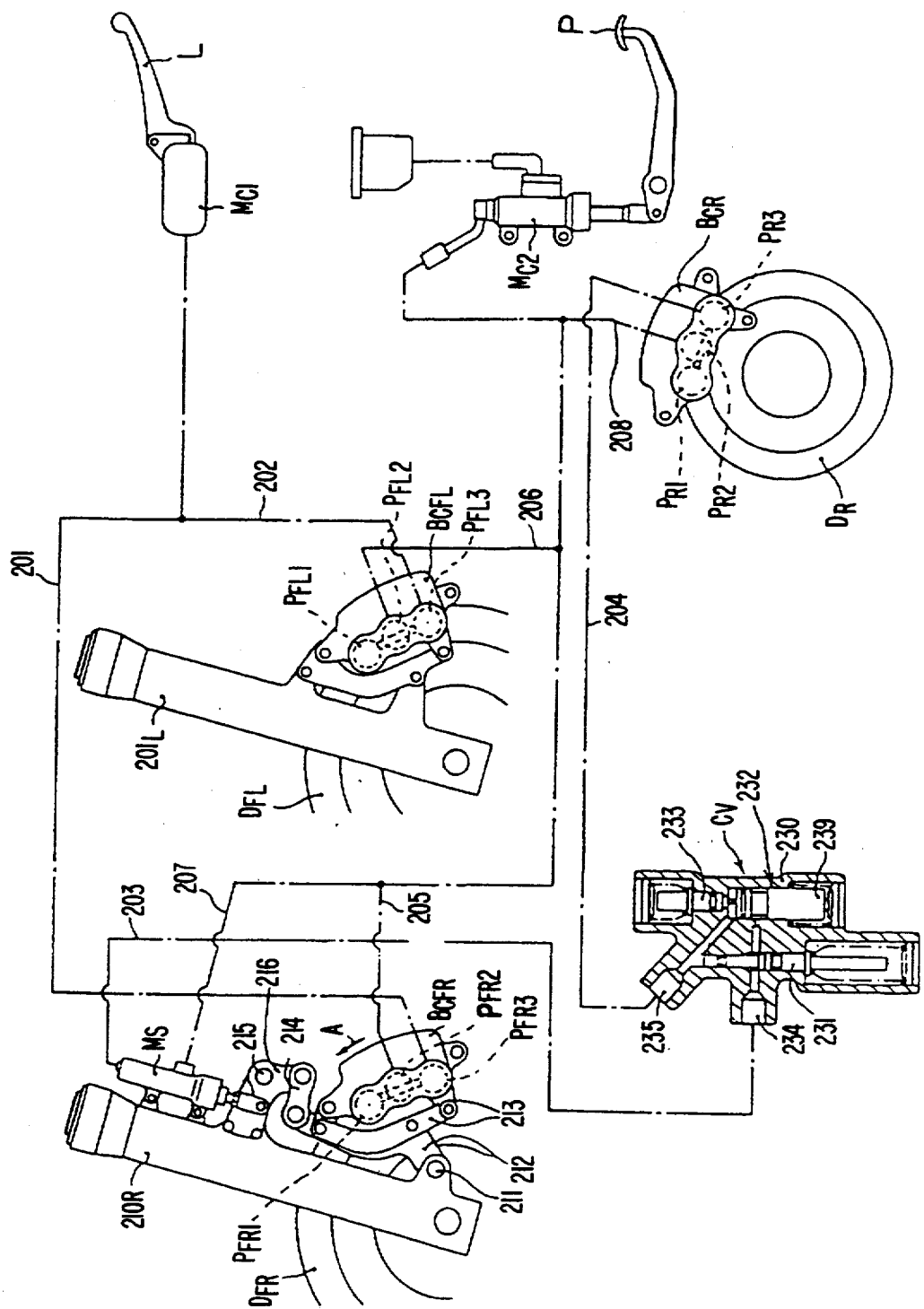
FIG. 14 is a total block diagram of the third embodiment of an aspect of the present invention.

Referring to FIG. 14, the right-side brake caliper $B_{CFR}$ is swingably attached on a front-fork right-side pipe 210R for interlocking with the mechanical servo Ms. On a pivot 211 installed on the right-hand pipe $210_R$, one end of a link 212 is pivotally attached. The right-side brake caliper $B_{CFR}$ is fixedly secured to the link 212 with an attachment part 213. The link 212 is attached at its other end with a L-shaped link 216 pivotally connected with a link 214 and a pivot 215 of the right-side pipe $210_R$. The mechanical servo Ms is connected to the top of the L-shaped link 216.

Figure 16:
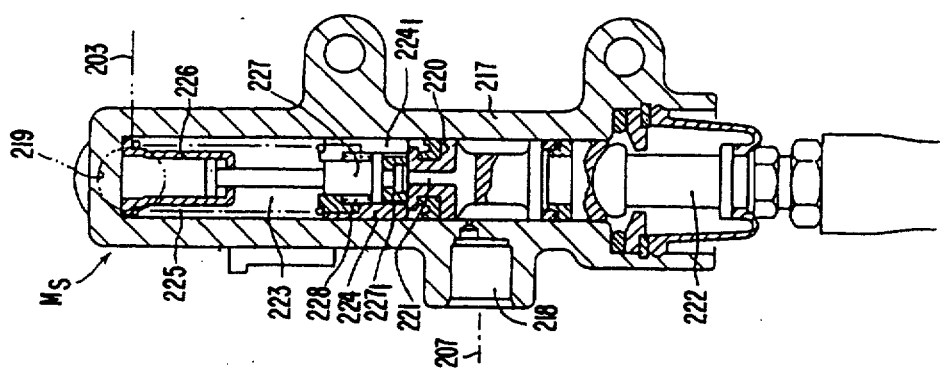
FIG. 16 is a sectional view of the mechanical servo in operation.
Figure 15:
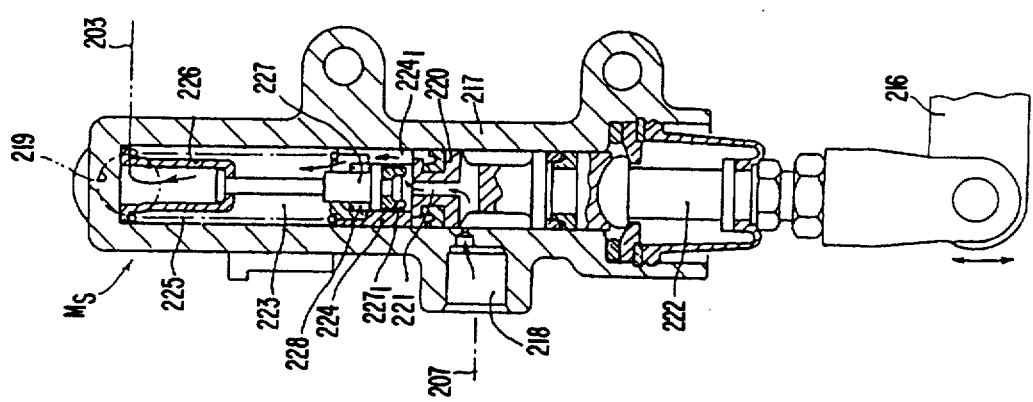
FIG. 15. is a sectional view of the mechanical servo.

Referring to FIGS. 15 and 16, a cylinder 217 of the mechanical servo Ms is provided with an entrance 218 to which the oil path 207 is connected and an exit 219 to which the oil path 203 is connected. The cylinder 217 accommodates a piston 220 having a vertical through-hole, the piston being moved upward by a rod 222. In an upper portion of the piston 220, an oil chamber 223 is formed. In this chamber, a cylindrical valve guide 224 having a notch $224_1$ is pressed against an upper face of the piston 220 through a spring 225. A valve hanger 226 is inserted between the top of the spring 225 and the ceiling of the oil chamber 223. A valve 227 is locked with a lower end of the valve hanger 226 in a vertically movable manner. At a lower end of the valve 227, an elastic contact portion $227_1$ is spaced opposite with the piston 220. The valve 227 is pressed downward with a small spring 228 installed between the valve guide 224 and the valve 227.

Consequently, when the brake caliper $B_{CFR}$ operates to press a disk $D_{FR}$ from both sides as shown in FIG. 14, the brake caliper $B_{CFR}$ is rotationally driven by the disk $D_{FR}$ in the direction of an arrow A together with the link 212 around the pivot 211, pushing up the piston 220 through the links 214 and 216 and the rod 222. The piston 220 goes up to abut on the valve 227 to close a passage 221, pressurizing oil in the oil chamber 223 into being pushed out of the oil path 203.

When pressurized oil is supplied from the oil path 207 and the piston 220 is down, communication is open through the passage 221 to transmit oil pressure through the oil chamber 223 to the oil path 203, eventually braking the rear wheel. This brake path acts in a brake operation when the front wheel is not rotating and the caliper $B_{CFR}$ does not shift in the direction of the arrow A such as when starting on a slope.

Figure 17:
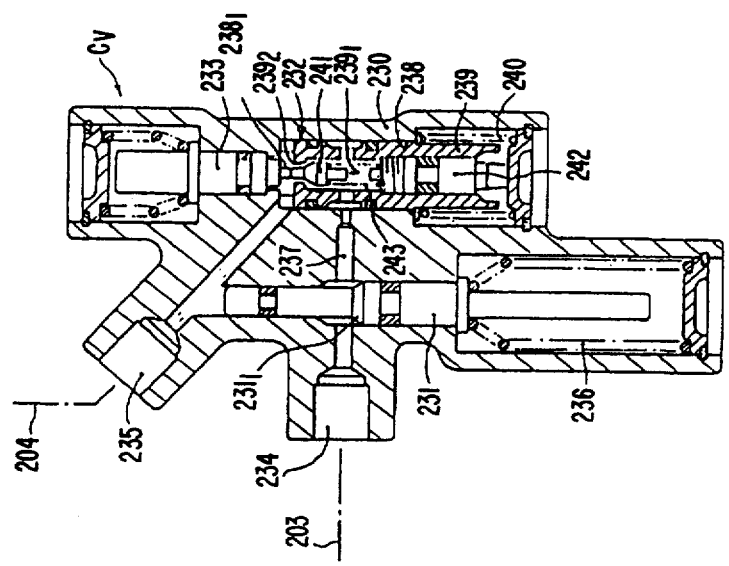
FIG. 17 is a sectional view of the pressure control valve.

In FIG. 14, a housing 230 of the pressure control valve $C_V$ accommodates a pressure reducing piston 231, a proportional valve 232, and a cut piston 233 to control oil pressure transmitted from an entrance passage 234 to an exit passage 235 and to the brake caliper $B_{CR}$ of the rear wheel. Referring to FIG. 17, the pressure reducing piston 231 has a shoulder $231_1$ to be pressed upward by a spring 236, the upper side of the piston 231 being in communication with the exit passage 235. The proportional valve 232 is installed in a valve chest 238 connecting to the passage 234 and a passage 237. A valve body 239, having a hollow $239_1$ connecting to the valve chest 238 and a valve hole $239_2$, is pressed upward by a spring 240, above which an upper chamber $238_1$ is formed.

A cut valve 241 is inserted in the valve hole $239_2$ at its upper portion. A plug 242 is loosely engaged in the hollow $239_1$ at its lower portion to be locked at its lower end with the housing 230. The cut valve 241 is pressed upward by a spring 243 installed between the plug 242 and the cut valve 241. The cut valve 241 abuts at its upper end on a lower end of the cut piston 233 to open the valve hole $239_2$ when the cut piston is pressed down by a spring 244. When the oil pressure in the upper chamber $238_1$ rises, the valve body 239 is pushed down to close the valve hole. When the pressure lowers, the valve hole $239_2$ opens.

Figure 18:
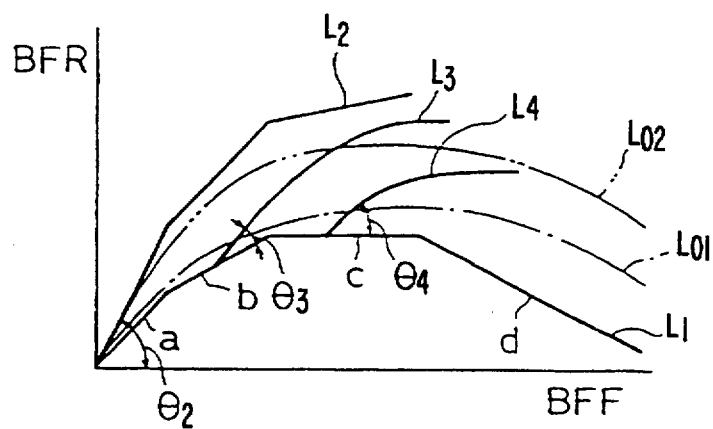
FIG. 18 is a diagram describing operations of the third embodiment of the present invention.

Oil pressure introduced from the entrance passage 234 and passage 237 into the valve chest 238 initially acts on the rear wheel brake caliper $B_{CR}$ from the exit passage 235 via the valve hole $239_2$ without resistance. FIG. 18 shows brake force distribution characteristics on both wheels. $L_{01}$ represents an ideal distribution curve with a single rider. $L_{02}$ represents an ideal distribution curve with two riders. $L_1$ represents a characteristic presented when the lever L alone is used. $L_2$ represents a characteristic presented when the pedal P alone is used. As indicated by a segment a of the curve $L_1$, brake forces BFF and BFR of both wheels are in a proportional relationship at the initial stage of lever L operation.

When the oil pressure introduced rises, a down-pressing force acting on the upper side of the valve body 239 increases to lower the valve body 239, causing the cut valve to close the valve hole $239_2$. When the inner pressure rises, the valve body 239 goes up to open the valve hole $239_2$ raising the pressure in the upper chamber $238_1$ to lower the valve body 239. Thus, the valve body 239 repeats an up/down motion to raise an exit pressure with a rising ratio being lower than the initial operation of the lever L, presenting a gentle slope as indicated by segment b. When the pressure introduced further rises, the cut piston 233 retreats to enlarge the volume of the upper chamber $238_1$, maintaining the rear wheel brake force BFF at an approximately constant level. This results in a curve as indicated by segment c. When the pressure rises still further, the pressure acts conspicuously on the upper side and the shoulder $231_1$ of the pressure reducing piston 231 to lower the piston 231, enlarging a volume in communication with the exit 235. As a result, the rear wheel brake force $B_{FR}$ is lowered as indicated by segment d.

Now, when the brake lever L is grasped to press the lever-system master cylinder $M_{C1}$ the pots $P_{FR1}$, $P_{FR3}$, $P_{FL1}$ and $P_{FL3}$ on the right and left brake calipers $B_{CFR}$ and $B_{CFL}$ are pressurized through the oil paths 201 and 202 to brake the two disks $D_{FR}$ and $D_{FL}$ on the front wheel. The right-side caliper $B_{CFR}$ runs along with the right-side disk $D_R$ in the direction of the arrow A to press the rod 222 of the mechanical servo Ms, increasing the pressure in the oil chamber 223. This pressurizes the two pots $P_{R1}$ and $P_{R3}$ of the rear wheel brake caliper $B_{CR}$ through the oil path 203 and the pressure control valve $C_V$ to brake the rear wheel. A brake force distribution characteristic obtained at this point of time is as indicated by $L_1$ in FIG. 18. If the pedal P alone is operated, the characteristic as indicated by $L_2$ is obtained. In FIG. 18, the rising tilt angle at this point of time be $\Theta_2$.

When the pedal P is pressed to operate the pedal-system master cylinder $M_{C2}$ while a lever brake operation is on, the center pots $P_{FR2}$ and $P_{FL2}$ on the two calipers $B_{CFR}$ and $B_{CFL}$ of the front wheel are pressurized through oil paths 205 and 206. At the same time, the center pot $P_{R2}$ on the caliper $B_{CR}$ of the rear wheel is pressurized. Rotation of the right-side caliper $B_{CFR}$ of the front wheel caused by an increase in the brake force of this caliper increases a pressure generated by the mechanical servo Ms. However, since the pressure control valve $C_V$ is already in operation, the pressure to be applied to the pots $P_{R1}$ and $P_{R3}$ varies along the lever brake force distribution characteristic $L_1$ shown in FIG. 18 but does not increase beyond segment c of this characteristic. This directly pressurizes only the pot $P_{R2}$ to increase its pressure. Consequently, an increment of the brake force of the rear-wheel pot $P_{R2}$ causes the brake force distribution characteristic $L_1$ to shift to $L_2$ or $L_3$ in the direction in which the rear wheel brake force increases based on an active force of the pot $P_{R2}$. At this point of time, if the pot $P_{R2}$ is equal to pot $P_{R1}$ and pot $P_{R3}$ in diameter, the brake force is about ⅓ as high as the rear-wheel brake force generated by a solo pedal operation, so that each of rising tilt angles $\Theta_3$ and $\Theta_4$ gets smaller than the tilt angle $\Theta_2$ obtained by the solo pedal operation. Therefore, setting an increase ratio to a proper level makes it possible to avoid an abrupt change in the brake force. If the lever and pedal brakes are simultaneously operated, no brake force exceeding the pedal brake force distribution characteristic $L_2$ is generated, thus enhancing operational feeling.

Figure 19:
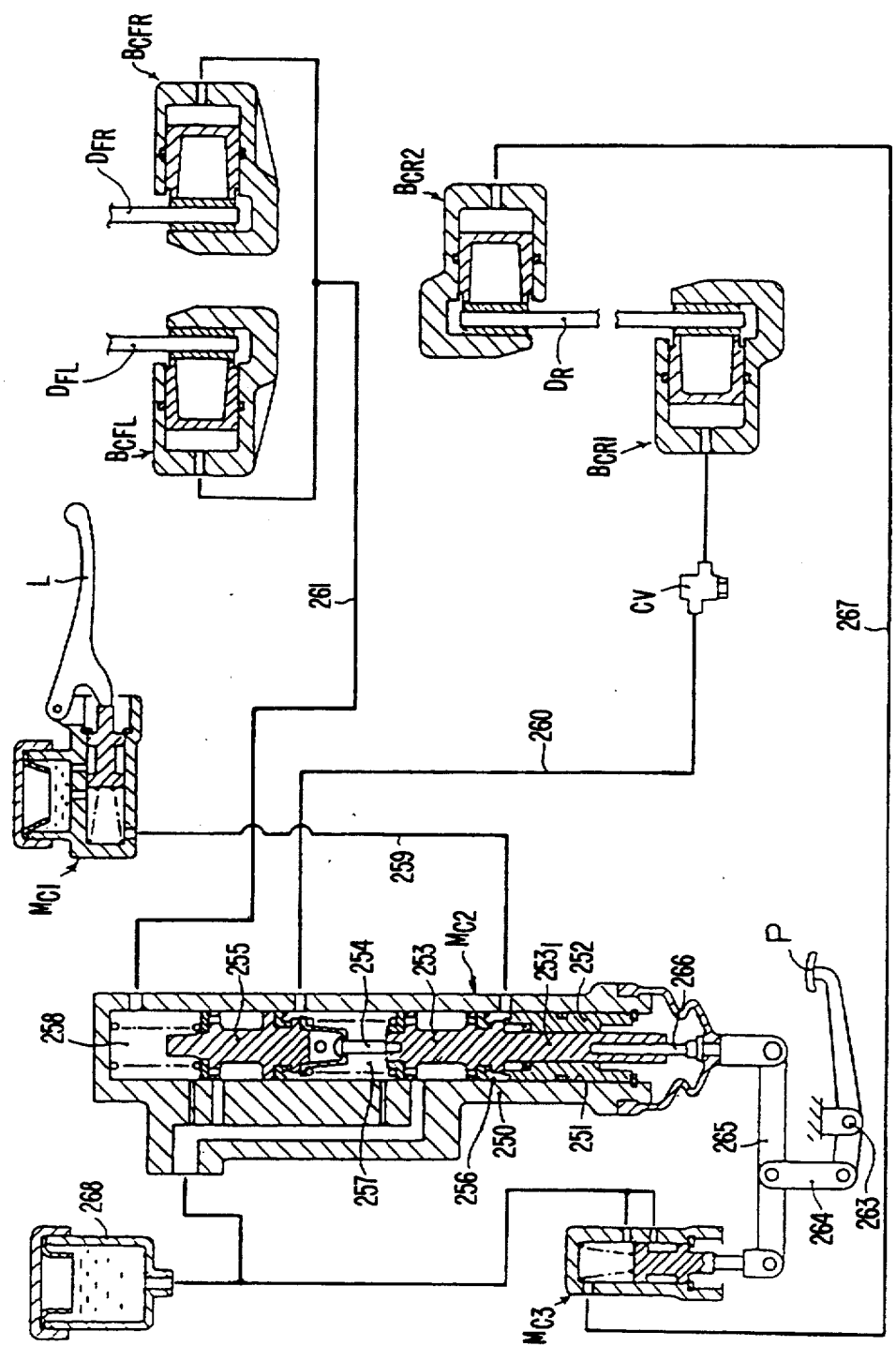
FIG. 19 is a total block diagram of a fourth embodiment of an aspect of the present invention.

With a fourth embodiment shown in FIG. 19, a pedal-system brake is provided with two master cylinders, by one of which a separately installed rear-wheel brake caliper is operated. A second master cylinder $M_{C2}$ for the pedal-system brake is built in a cylinder 250. In an inner chamber 251 of the cylinder 250, a seal pipe 252 is fixedly secured at a lowest level through which a rod $253_1$ runs. A first piston 253 is fixed with this rod, above which a second piston 255 is inserted via a linking part 254 and a spring. Oil chambers 256, 257, and 258 are arranged along this assembly. A first master cylinder $M_{C1}$ for the lever-system brake and the bottom oil chamber 256 are connected with an oil pipe 259. The middle oil chamber 257 is connected through an oil path 260 and a pressure control valve $C_V$ with a rear brake caliper $B_{CR1}$. The top oil chamber 258 is connected through an oil path 261 with two front-wheel brake calipers $B_{CFR}$ and $B_{CFL}$.

A pedal P is pivotally secured by a pivot 263 to which a lever 265 is connected through a link 264 in a manner of a balance. The lever 265 is linked at one end with a rod 266 which is connected with the rod $253_1$ of the second master cylinder $M_{C2}$. Another end of the lever 265 is connected with a third master cylinder $M_{C3}$ whose oil path 267 is connected with a separately installed brake caliper $B_{CR2}$. Reference numeral 268 indicates an oil tank.

When the lever L is operated, oil pressure is applied to the oil chamber 256 to raise the first piston 253, transmitting the oil pressure generated in the oil chamber 257 through the oil path 260 and the pressure control valve $C_V$ to the first rear-wheel brake caliper $B_{CR1}$. At the same time, the second piston 255 is raised to transmit oil pressure in the oil chamber 258 to the front-wheel brake calipers $B_{CFR}$ and $B_{CFL}$.

When the pedal P alone is pressed, the first piston 253 is directly raised, in turn raising the second piston 255 to supply oil pressure in the same manner as operating the lever L. Further, the third master cylinder $M_{C3}$ operates to operate the second rear-wheel brake cylinder $B_{CR2}$. Therefore, a brake characteristic indicated by $L_2$ in FIG. 18 is obtained. When the pedal P is pressed during an operation of the lever L, the brake force of the second rear-wheel brake caliper $B_{CR2}$ is added to $L_1$ of FIG. 18, so that characteristics indicated by $L_3$ and $L_4$ of FIG. 18 are obtained.

Figure 20:
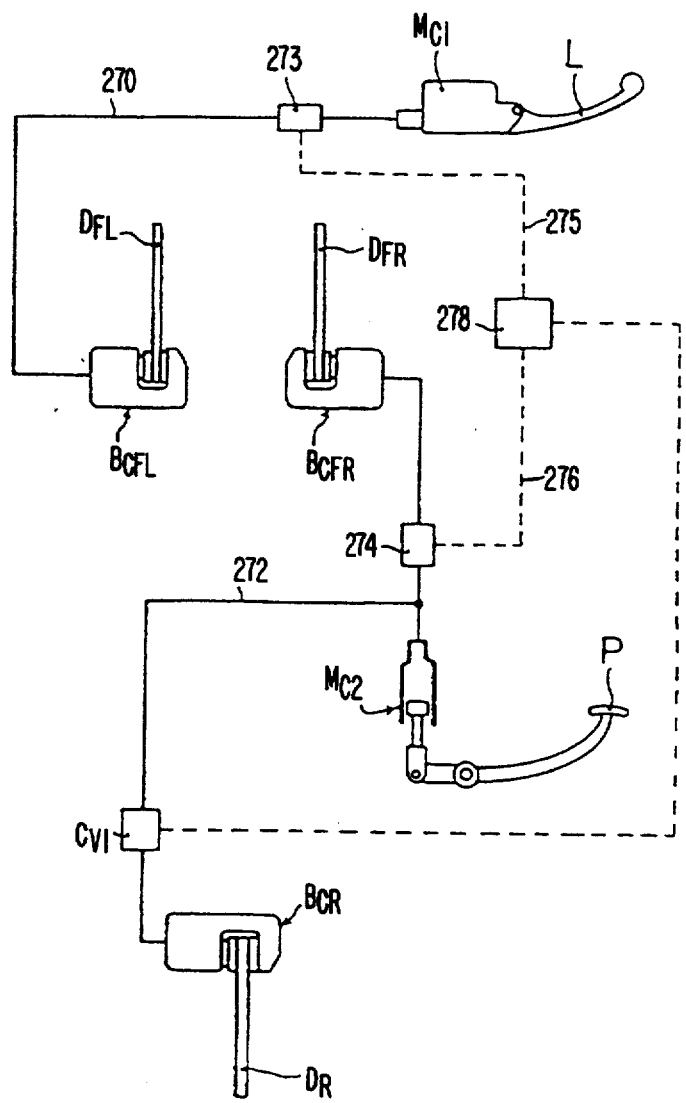
FIG. 20 is a schematic diagram of a fifth embodiment of an aspect of the present invention.

A fifth embodiment will be described as follows by referring to FIGS. 20 and 21. A lever-system brake master cylinder $M_{C1}$ is in communication through an oil path 270 with only a front-wheel brake caliper $B_{CFL}$. A pedal-system brake master cylinder $M_{C2}$ is in communication through an oil path 271 with another front-wheel brake caliper $B_{CFR}$ and through an oil path 272 with a rear-wheel brake caliper $B_{CR}$. The oil paths 270 and 271 are respectively provided with input detecting sensors 273 and 274. Circuits 275 and 276 for transmitting input signals of the sensors 273 and 274 are connected to a signal circuit 278 which controls a pressure control valve $C_{V1}$, or restraining means.

Figure 21:
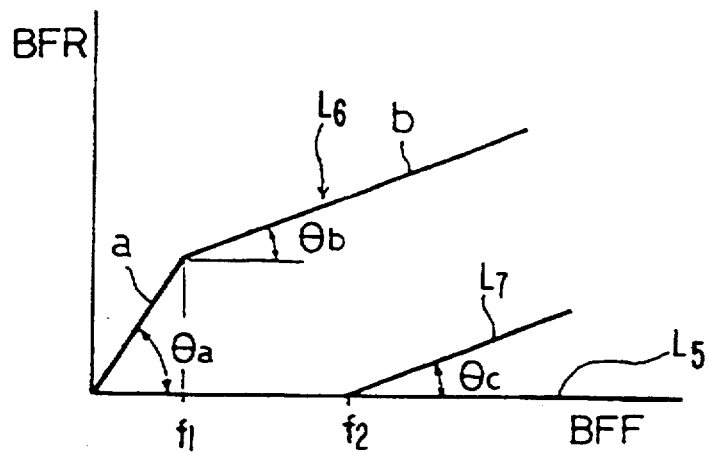
FIG. 21 is a diagram describing operations of the fifth embodiment of the present invention.
Figure 22:
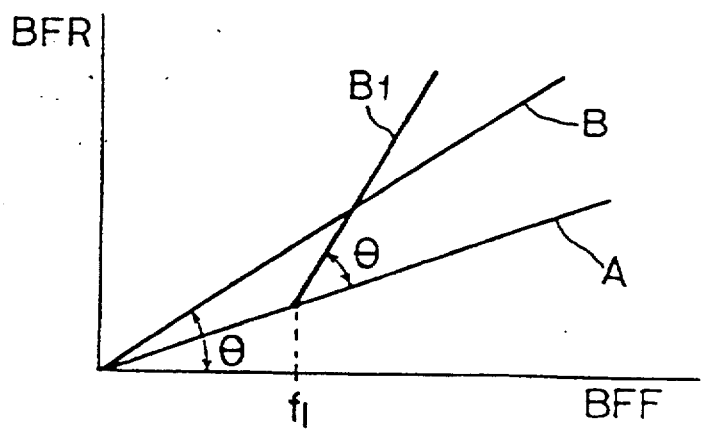
FIG. 22 is a diagram describing operations of a conventional brake apparatus.

First, when the lever system brake master cylinder $M_{C1}$ alone is operated by pressing a lever L, only the front-wheel brake caliper $B_{CFL}$ is pressurized to generate a front-wheel brake force BFF along a line $L_5$ which matches a horizontal axis of FIG. 21. When a pedal P alone is pressed, the pedal-system brake master cylinder $M_{C2}$ pressurizes the front and rear brake calipers $B_{CFR}$ and $B_{CR}$ through the oil paths 271 and 272 to produce a characteristic indicated by a line $L_6$. Initially, a brake indicated by a segment a is performed with a front/rear distribution ratio of angle $\Theta a$. When a front-wheel brake force has reached $f_1$, it is reduced by the pressure control valve $C_{V1}$, or the restraining means, to a distribution ratio of angle $\Theta b$ to perform a brake operation indicated by a segment b. Consequently, operating the pedal P at a point $f_2$ where the front-wheel BFF brake force is large in a solo use of the lever brake restrains the brake force to $\Theta_c$ having a smaller rising angle 13 than $\Theta$a to obtain a characteristic which follows the line $L_7$ from a midpoint alone the line $L_5$. Thus, the brake force for the rear wheel gently increases, making it possible to prevent an abrupt change in the brake force, resulting in smooth brake operation.

FIG. 23 through FIG. 30 show a further embodiment.

Figure 23:
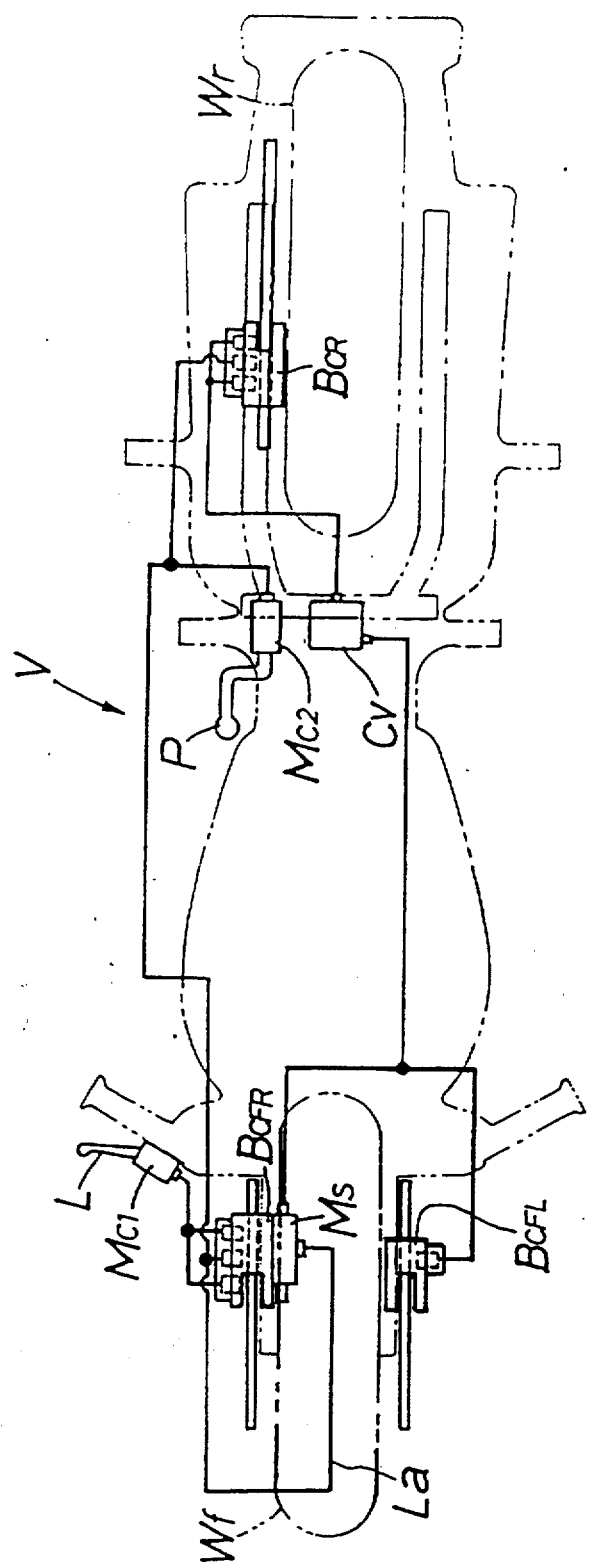
FIG. 23 is a plan view of a motorcycle having a brake apparatus practiced as a sixth embodiment of an aspect of the present invention.
Figure 24:
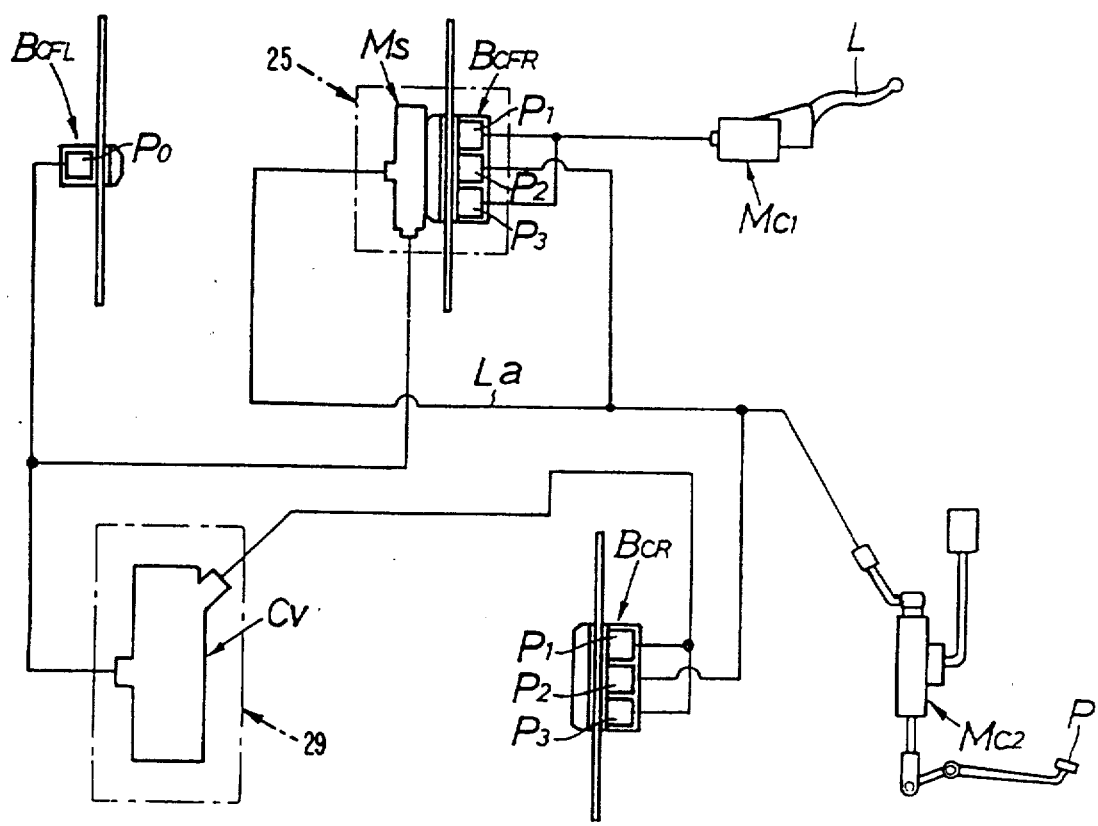
FIG. 24 is an overall block diagram of the brake apparatus of FIG. 23.

Referring to FIGS. 23 and 24, a motorcycle V has a brake lever L installed on a steering handle and a pedal P installed on a body frame. A front wheel Wf has right-side and left-side brake cylinders $B_{CFR}$ and $B_{CFR}$. The right-side brake cylinder $B_{CFR}$ has three pots, a front pot $P_1$, a center pot $P_2$, and rear pot $P_3$. The left-side brake cylinder $B_{CFL}$ has one pot, a pot $P_0$. A brake cylinder $B_{CFR}$ installed on a rear wheel Wr has three pots, a front pot $P_1$, a center pot $P_2$, and a rear pot $P_3$.

A first master cylinder $M_{C1}$ operated by the above-mentioned brake lever L is directly connected to the front pot $P_1$ and the rear pot $P_3$ on the right-side brake cylinder $B_{CFR}$ of the front wheel Wf. The above-mentioned right-side brake cylinder $B_{CFR}$ has a mechanical servo Ms which generates brake oil pressure by using a brake force on the front wheel Wf. The brake oil pressure generated by the mechanical servo Ms is transmitted to the pot $P_0$ on the left-side of the front wheel Wf and to the front pot $P_1$ and the rear pot $P_3$ on the brake cylinder $B_{Cr}$ of the rear wheel Wr through a pressure control valve $C_V$. On the other hand, a second master cylinder $M_{C2}$ operated by the brake pedal P is connected to the center pot $P_2$ on the right-side brake cylinder of the front wheel Wf and the center pot $P_2$ of the brake cylinder $B_{CR}$ of the rear wheel Wr and to the above-mentioned mechanical servo Ms through an auxiliary oil path La.

Figure 25:
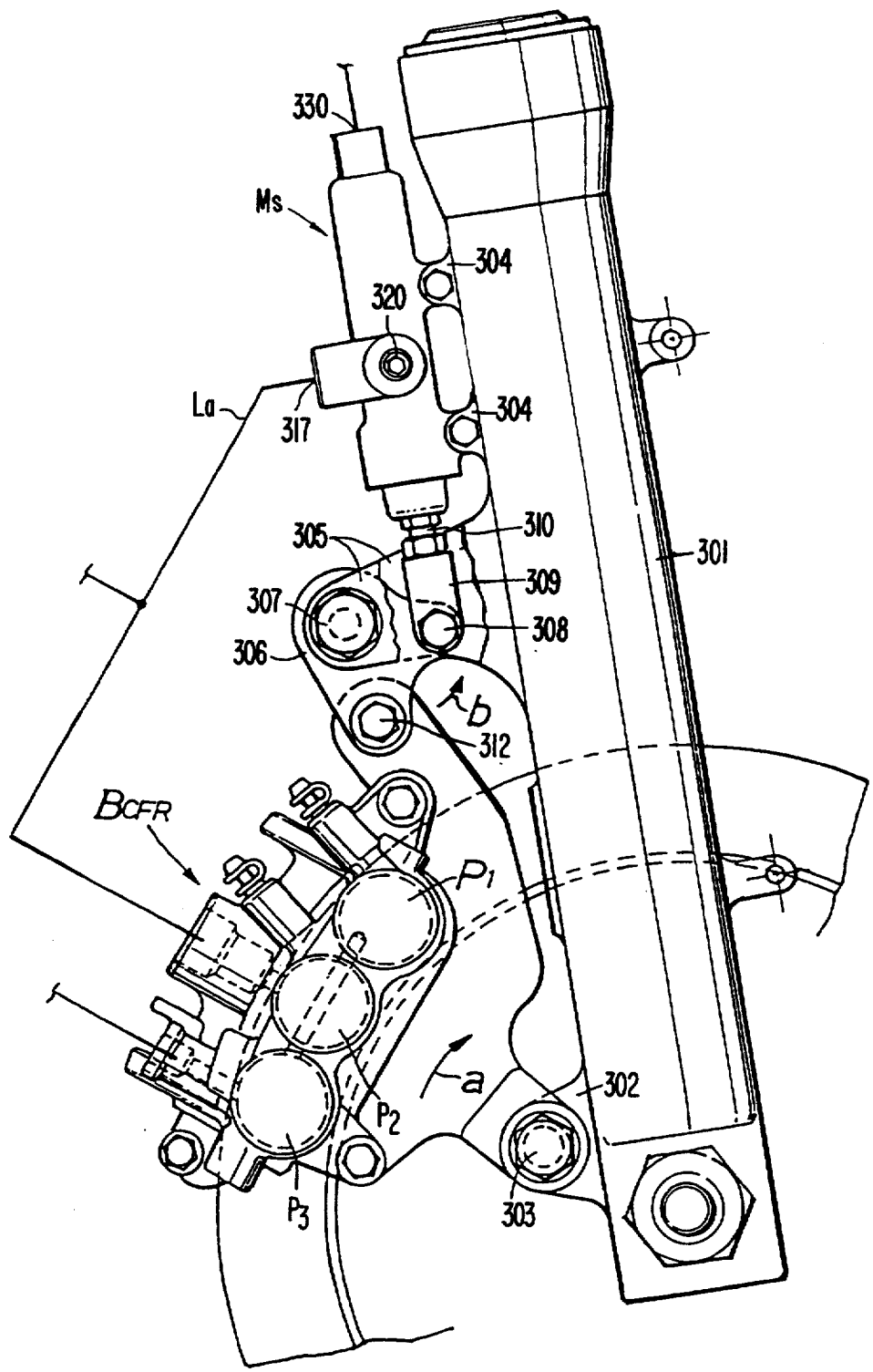
FIG. 25 is en enlarged view of portion 25 of FIG. 24.

Referring to FIG. 25, the right-side brake cylinder $B_{CFR}$ of the front wheel Wf is swingably pivoted on a bracket 302 fixedly secured on a front fork 1 at its bottom through a pin 303. The approximately cylindrical mechanical servo Ms is longitudinally supported by the front fork 301 at its upper portion along its rear side through a pair of brackets 304. On a bracket 305 fixedly secured to the front fork 1, an L-shaped link 306 is swingably pivoted through a pin 307. A rod 310 unitized with a link member 309 pivotally secured to one end of the link 306 through a pin 308 abuts at its top on a lower end of a piston 311 (refer to FIG. 26) of the above-mentioned mechanical servo Ms. The above-mentioned link 306 is also pivotally secured at another end to the top of the above-mentioned brake cylinder $B_{CFR}$ through a pin 312. Consequently, when the front wheel Wf is braked to move the brake cylinder $B_{Cf}$ in the direction of an arrow a, the link 306 moves in the direction of arrow b to push up the rod 310, making the mechanical servo Ms generate a secondary brake oil pressure.

Figure 26:
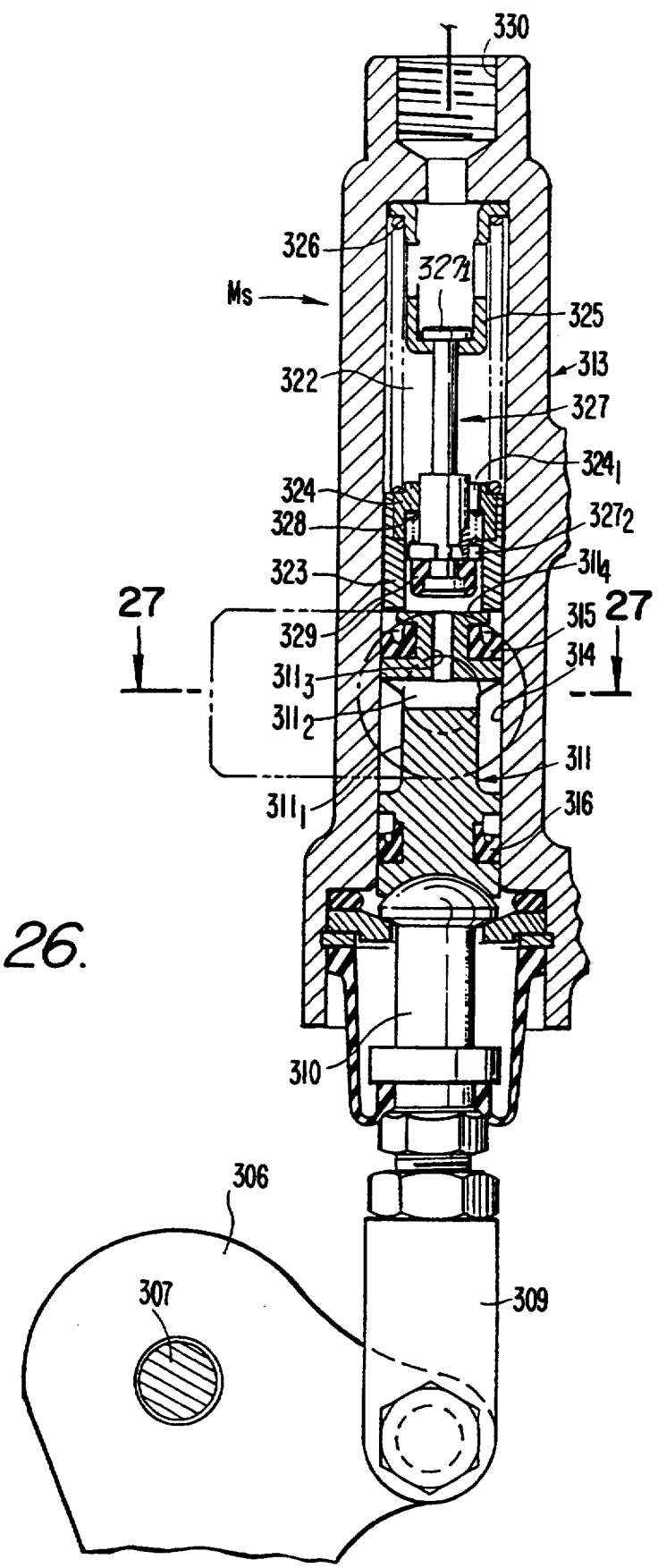
FIG. 26 is an enlarged sectional view of the main portion of FIG. 25.
Figure 27:
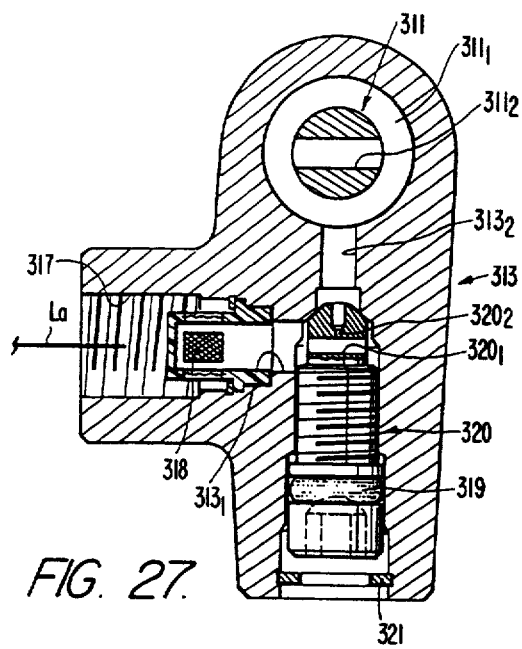
FIG. 27 is a cross-sectional view at line 27—27 of FIG. 26.

As seen from FIGS. 26 and 27, a casing 313 of the mechanical servo Ms is internally formed with a cylinder 314. The piston 311 slidably fitted in the cylinder 314 is provided at its upper and lower ends with a primary cup 315 and a secondary cup 316, respectively. Between the primary cup 315 and the secondary cup 316, a circular oil groove $311_1$ formed around the piston 311 opens into a valve seat $311_4$ formed on the piston 311 at its upper side through oil paths $311_2$, and $311_3$.

The casing 313 has an input port 317 at its side connecting to the above-mentioned second master cylinder $M_{C2}$. The input port 317 is in communication with the oil groove $311_1$ of the piston 311 through a mesh filter 318 and oil paths $313_1$ and $313_2$. The casing 313 is threaded with an orifice bolt 320, having an O-ring 319 around it, extending in a direction crossing the above-mentioned input port 317, the orifice bolt 320 from escaping. The orifice bolt 320 is formed at its top with an oil path $320_1$ diametrically extending across the bolt 320. Extending axially, to the end of the bolt 320 from the oil path 320, is an orifice $320_2$ in communication with the above-mentioned oil path $313_2$. Therefore, the input port 317 is in communication with the oil groove $311_1$ of the piston 311 through the mesh filter 318, the oil path $313_1$ of the casing 313, the oil path $320_1$ of the orifice bolt 320, the orifice $320_2$ of the orifice bolt 320, and the oil path $313_2$ of the casing 313, from which the input port 317 is further in communication with the valve seat $311_4$ through the oil paths $311_2$ and $311_3$ of the piston 311. When the orifice bolt 320 is loosened back to a position shown in FIG. 28, the orifice bolt 320 is formed at its top with a gap $\delta$, providing communication between the input port 317 and the oil groove $311_1$ of the piston 311 through the gap $\delta$ without passing the orifice $320_2$.

In an oil chamber 322 formed at the top of the cylinder 314, a first circular valve guide 323 and a second valve guide 324 are slidably supported one within the other. A return spring 326 compressed between the second valve guide 324 and a third valve guide 325 provided on an upper end of the cylinder 314 presses the first valve guide 323 to abut at its lower end on a top face of the piston 311. On the above-mentioned first, second, and third valve guides 323, 324, and 325, a valve 327 is slidably supported. The valve 327 is pressed in a downward direction by a valve spring 328 compressed between the second valve guide 324 and a valve body 329, that is in a direction in which the valve body 329 installed at a bottom of the valve 327 sits on the valve seat $311_4$ of the piston 311.

In a state when the mechanical servo Ms is not operating, as shown in FIG. 26, a flange $327_1$ formed on the valve 327 on its upper end is locked to the third valve guide 325 to make the valve body 329 of the valve 327 move from the valve seat $311_4$. At this point of time, the oil path $311_3$ of the piston 311 opened by the valve $311_4$ communicate with the oil chamber 322 through a plurality of notches $327_2$ formed around the valve 327 and a plurality of notches $324_1$ formed on the second valve guide 324. The oil chamber 322 in turn communicate with the left-side brake cylinder $B_{CFL}$ of the front wheel and the pressure control valve $C_V$ through an output port 330.

Figure 29:
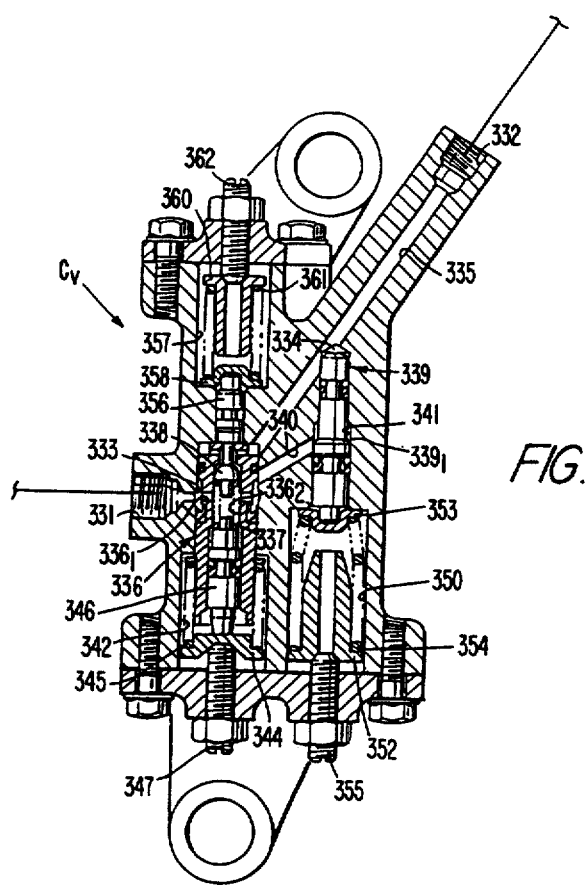
FIG. 29 is an enlarged sectional view of portion 29 of FIG. 24.

Next, a constitution of the above-mentioned pressure control valve $C_V$ will be described in detail by referring to FIG. 29. The pressure control valve $C_V$ is provided with an input port 331 connected to the output port 330 of the mechanical servo Ms and an output port 332 connected to pots $P_1$ and $P_3$ on the brake cylinder $B_{Cr}$ of the rear wheel Wr. A valve chest 333 in communication with the input port 331 and an oil chamber 334 in communication with the output port 332 are in communication with each other through an oil path 335. The valve chest 333 is internally arranged with a cylindrical proportional valve in a vertically movable manner. An inner chamber $336_2$ of the proportional valve 336 in communication with the above-mentioned input port 331 through an oil hole $336_1$ is internally arranged with a cut valve 338 pressed by a valve spring 337 in a valve closing direction. When the cut valve 338 is at a valve opening position shown, the input port 331 communicates with the output port 332 through the above-mentioned oil hole $336_1$, the inner chamber $336_2$, a periphery of the cut valve 338, the oil path 335, and the oil chamber 334. The pressure control valve CV is further provided with a pressure reducing piston 339 which extends to meet the above-mentioned oil chamber 334. A shoulder $339_1$ formed in the middle of the pressure reducing piston 339 is arranged in a valve chest 341 which is in communication with the above-mentioned valve chest 333 through an oil path 340.

A spring chamber 342 installed under the above-mentioned valve chest 333 is internally provided with a spring seat 344 locked with a stopper bolt 347. Between the spring seat 344 and the proportional valve 336, a valve spring 345 is compressed. An auxiliary valve body 346 is slidably fit in the inner chamber $336_2$ of the proportional valve 336 to abut at its lower end on the spring seat 344 and support at its upper end the valve spring 337 which presses the above-mentioned cut valve 338.

A spring chamber 350 in communication with the pressure reducing piston 339 at its lower side is internally provided with a spring seat 352 locked with a stopper bolt 355. Between the spring seat 352 and a spring seat 353 supporting the above-mentioned pressure reducing piston 339 at its lower end, a valve spring 354 is compressed. The valve chamber is arranged at its upper portion with an auxiliary valve body 356 in a vertically movable manner, which abuts on the above-mentioned cut valve 338 at its upper end to forcibly open it. The auxiliary valve body 356 abuts at its upper end on a spring seat 358 arranged inside a spring chamber 357. Between the spring seat 358 and a spring seat 360 locked with a stopper bolt 362, a valve spring 361 is compressed.

When the brake lever L is operated, a brake oil pressure is generated by the first master cylinder $M_{C1}$ and is transmitted to the two pots $P_1$ and $P_3$ on the right-side brake cylinder $B_{CFR}$ of the front wheel Wf. At this moment, as seen from FIGS. 25 and 26, the brake cylinder $B_{CFR}$ swings around the pin 303 in the direction of arrow a to push up the rod 310 of the mechanical servo Ms via the link 306, causing the piston 311 to advance through the cylinder 314 against the force of the return spring 326. This immediately causes the valve seat $311_4$ formed on the top face of the piston 311 to sit on the valve body 329 installed on the valve 327 at its lower end, blocking communication between the input port 317 and the oil chamber 322. When the piston 311 further advances, a secondary brake oil pressure in proportion to its stroke is generated in the oil chamber 322 and is transmitted from the output 330 to the pot $P_0$ on the left-side brake cylinder $B_{CFL}$ of the front wheel and to the two pots $P_1$ and $P_3$ on the brake cylinder $B_{CR}$ of the rear wheel Wr through the pressure control valve $C_V$.

When the brake pedal P is operated, a brake oil pressure is generated by the second master cylinder $M_{C2}$ and transmitted to the center pot $P_2$ on the right-side brake cylinder $B_{CR}$ of the rear wheel Wr and to the input port 317 of the mechanical servo Ms. As mentioned above, the mechanical servo Ms operates by an operation of the right-side brake cylinder $B_{CFR}$ of the front wheel Wf to generate a secondary brake oil pressure, which is transmitted from the output port 330 to the left-side brake cylinder $B_{CFL}$ of the front wheel and the pressure control valve $C_V$.

The brake oil pressure transmitted to the input port 317 of the mechanical servo Ms is then transmitted to the valve seat $311_4$ of the piston 311 through the mesh filter 318, the oil path $313_1$ of the casing 313, the oil path 320 of the orifice bolt 320, the orifice $320_2$ of the orifice bolt 320, the oil path $313_2$ of the casing 313, the oil groove $311_1$ of the piston 311, and the oil path $311_2$ of the piston 311. At this moment, if the brake oil pressure transmitted from the input port 317 to the valve seat $311_4$ of the piston 311 is greater than that generated in the oil chamber 322 by the action of the mechanical servo Ms, the valve body 329 departs from the valve seat $311_4$ against the force of the valve spring 328, causing the brake oil pressure transmitted from the input port 317 to the valve seat $311_4$ of the piston 311 to be transmitted to the output port 330 through the notch $327_2$ of the valve 327, the notch $324_1$ of the second valve guide 324, and the oil chamber 322. From the output port 330, this brake oil pressure is transmitted to the left-side brake cylinder $B_{CFL}$ of the front wheel and the pressure control valve $C_V$. That is, if the second master cylinder $M_{C2}$ operates, either the secondary brake oil pressure generated by the mechanical servo Ms or the brake oil pressure transmitted from the second master cylinder $M_{C2}$ to the input port 317 of the mechanical servo Ms, whichever is greater, is selected to be transmitted to the output port 330.

It should be noted that, if the brake oil pressure generated by the mechanical servo Ms and the brake oil pressure transmitted from the second master cylinder $M_{C2}$ to the input port 317 compete with each other, an intermittent open/close operation of the above-mentioned valve 327 may cause a vibration in an auxiliary oil path $L_1$ connecting the second master cylinder $M_{C2}$ with the input port 317 of the mechanical servo Ms. However, according to the present invention, the vibration generated in the auxiliary oil path $L_1$ by the intermittent open/close operation of the valve 327 can be dampened to avoid reduction in brake feeling.

When the brake oil pressure generated by the mechanical servo Ms upon operation of the brake lever L is applied to the input port 331 of the pressure control valve $C_V$, it is then transmitted to the brake cylinder $B_{CR}$ of the rear wheel Wr through the oil hole $336_1$ of the proportional valve 336, the periphery of the cut valve 338, the oil path 335, the oil path 334, and the output 332. At this moment, the brake forces on the front wheel Wf and the rear wheel Wr increase in proportion to the operation of the brake lever L, resulting in a brake force distribution characteristic indicated by a line connecting points O and A in FIG. 30.

Figure 30:
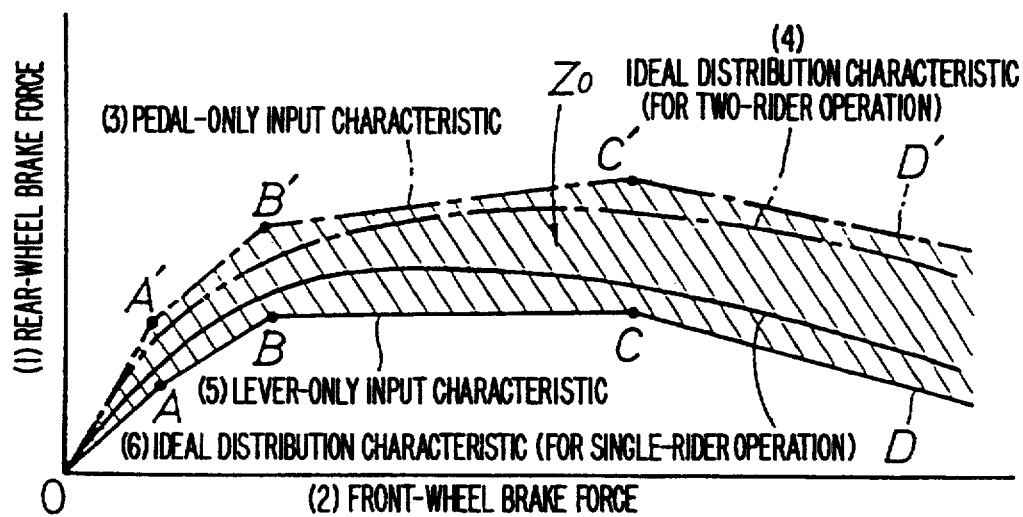
FIG. 30 is a graph showing brake characteristics.

When the brake oil pressure transmitted to the input port 331 of the pressure control valve $C_V$ gradually increases to cause the brake force of the rear wheel Wr to reach point A in FIG. 30, the proportional valve 336 is lowered by the brake oil pressure acting on its upper side against a setting load of the valve spring 345. As a result, the proportional valve 336 comes in contact with the cut valve 338 to temporarily blocking communication between the input port 331 and the output port 332. When the brake oil pressure to the input port 331 increases further, a pressure inside the inner chamber $336_2$ of the proportional valve 36 increases to push up the proportional valve 336 again, restoring the communication between the input port 331 and the output port 332. Thus, as the brake oil pressure increases, the proportional valve 336 vertically vibrates to intermittently open/close a gap between the proportional valve and the cut valve 338, reducing the increase in the ratio of the brake oil pressure to be transmitted to the brake cylinder $B_{CR}$. Consequently, the ratio of the brake force on the rear wheel Wr starts reducing beyond point A of FIG. 30.

When the brake oil pressure to the input port 331 of the pressure control valve $C_V$ further increases to cause the brake force on the rear wheel Wr to reach point B of FIG. 30, an auxiliary valve body 356 goes up against a setting load of the valve spring 361 to push up the cut valve 338 pressed by the valve spring 337 onto the proportional valve 336. This completely blocks the communication between the input port 331 and the output port 332, so that, even if the brake oil pressure transmitted thereafter to the input port 331 increases, the brake oil pressure from the output port 332 to the brake cylinder $B_{CR}$ is kept at a constant level.

When the brake oil pressure to the input port 331 of the pressure control valve $C_V$ further increases to cause the brake force on the rear wheel Wr to reach point C in FIG. 30, the brake oil pressure is transmitted to the oil chamber 341 through the oil path 340 to lower the pressure reducing piston 339 against a setting load of the valve spring 354. This increases the volume of the oil chamber 334 to reduce the brake oil pressure to be transmitted to the brake cylinder $BC_R$.

Thus, the action of the pressure control valve $C_V$ changes, in four steps, the oil pressure to be transmitted to the brake cylinder $B_{CR}$ of the rear wheel Wr, or the brake force on the rear wheel Wr. And the distribution characteristic between the brake forces on the front wheel Wf and the rear wheel Wr varies as indicated by a line O-A-B-C-D of FIG. 30, providing a distribution characteristic very similar to an ideal distribution characteristic for a single-rider operation.

When the brake pedal P is operated, the brake oil pressure generated by the mechanical servo Ms or the brake oil pressure transmitted through the mechanical servo Ms is applied to the input port 331 of the pressure control valve $C_V$ to control the brake oil pressure to be transmitted to the brake cylinder $C_{BR}$ of the rear wheel Wr in steps as described above. At the same time, the brake oil pressure generated by the second master cylinder $M_{C2}$ is directly transmitted to the center pot $P_2$ on the brake cylinder $B_{CR}$ of the rear wheel Wr to brake the rear wheel Wr. As a result, in terms of the brake force distribution characteristic provided by an operation of the brake pedal P, the brake force on the rear wheel Wr gets greater than that on the front wheel by an amount added by the center pot $P_2$ of the brake cylinder $B_{CR}$ as compared with the above-mentioned operation of the brake lever L. This provides a characteristic very near an ideal distribution characteristic for a two-rider operation as indicated by a line O-A'-B'-C'-D' in FIG. 30. Consequently, simultaneously or separately operating the brake lever L and the brake pedal P provides any brake force distribution characteristic inside the hatched area $Z_0$ defined by the line O-A-B-C-D and the line O-A'-B'-C'-D' in FIG. 30.

Figure 28:
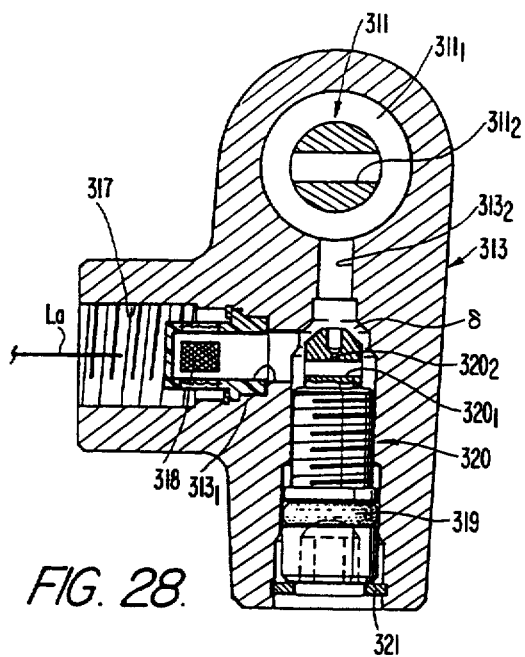
FIG. 28 depicts the function of the embodiment.

It should be noted that, when brake oil is poured in the brake apparatus of the finished motorcycle V at the factory, the orifice bolt 320 of the mechanical servo Ms is loosened as shown in FIG. 28 to form a gap δ around the orifice bolt. This allows the brake oil to be poured without having to pass it through the orifice $320_2$, thereby shortening brake oil pouring time.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A brake system for a motorcycle having front and rear wheels, comprising:
    a first master cylinder;
    a second master cylinder;
    a first front wheel brake actuator hydraulically coupled to said first master cylinder;
    a second front wheel brake actuator hydraulically coupled to said second master cylinder;
    a first rear wheel brake actuator;
    a first pressure control hydraulically coupled to said first master cylinder and to said first rear wheel brake actuator and including a first valve controlling hydraulic pressure to said first rear wheel brake actuator responsive to hydraulic pressure from said first master cylinder and an adjustor having a plurality of positions to selectively change at least one setting load in said first valve;
    said first pressure control having restraining means providing, when said first master cylinder is actuated during actuation of said second master cylinder, a first rate of increase of a ratio of braking force applied to said rear wheel and braking force applied to said front wheel and a second, lower rate of increase of a ratio of braking force applied to said rear wheel and braking force applied to said front wheel when braking force on the front wheel is above a first value.

2. The brake system of claim 1 wherein said restraining means provides, when said first master cylinder is actuated during actuation of said second master cylinder, a third rate of increase of a ratio of braking force applied to said rear wheel and braking force applied to said front wheel, lower than said second rate of increase, when braking force on the front wheel is above a second value.

3. The brake system of claim 2 further comprising a hand lever and a foot pedal, said hand lever being coupled to operate said second master cylinder and said foot pedal being coupled to operate said first master cylinder.

4. The brake system of claim 1 wherein said adjustor includes a variable volume chamber, a driver to vary the volume of said chamber, pistons, and set springs each fixed at one end of a said piston, respectively, said pistons being slidably positioned in said first pressure control and hydraulically coupled to said variable volume chamber.

5. The brake system of claim 4 wherein said driver includes preselected positions.

6. The brake system of claim 1 further comprising a second pressure control and a mechanical servo hydraulically coupled with said first master cylinder, said mechanical servo being mounted to said first front wheel brake actuator to be actuated upon braking by said first front wheel brake actuator, a second rear wheel brake actuator coupled to said second pressure control, said second pressure control being hydraulically coupled to said mechanical servo.

7. The brake system of claim 6 wherein said adjustor includes a valve cylinder, a proportional valve in said valve cylinder, a stop against which said proportional valve abuts, said stop being axially movable within said valve cylinder, and a cam abutting against said stop and rotatably mounted to said valve cylinder, rotation of said cam axially advancing and retracting said stop.

8. The brake system of claim 7 wherein said mechanical servo includes a valved flow path between said first master cylinder and said second pressure control, said flow path including a flow restricting orifice.

9. The brake system of claim 1 wherein said adjustor includes a valve cylinder, a proportional valve in said valve cylinder, a stop against which said proportional valve abuts, said stop being axially movable within said valve cylinder, and a cam abutting against said stop and rotatably mounted to said valve cylinder, rotation of said cam axially advancing and retracting said stop.

10. A brake system for a motorcycle having front and rear wheels, comprising:

a first master cylinder;

a second master cylinder;

a first front wheel brake actuator hydraulically coupled to said first master cylinder;

a second front wheel brake actuator hydraulically coupled to said second master cylinder;

a rear wheel brake actuator;

a pressure control hydraulically coupled to said first master cylinder and to said rear wheel brake actuator having restraining means providing a first ratio of pressures between said rear wheel brake actuator and said first master cylinder when said first master cylinder is applied alone and a second, lower ratio of pressure between said rear wheel brake actuator and said first master cylinder when braking force on the front wheel from said second master cylinder is above a first value;

said restraining means further providing, when said first master cylinder is actuated during actuation of said second master cylinder, a first rate of increase of a ratio of braking force applied to said rear wheel and braking force applied to said front wheel and a second, lower rate of increase of a ratio of braking force applied to said rear wheel and braking force applied to said front wheel when braking force on the front wheel is above a second value.

11. The brake system of claim 10 wherein said pressure control includes a mechanical servo mechanically coupled with said second front wheel brake actuator and hydraulically coupled with said first master cylinder, and a control valve, said mechanical servo sensing brake force on the front wheel from said second master cylinder and being hydraulically coupled with said control valve.

12. The brake system of claim 11 wherein said mechanical servo includes a valved flow path between said first master cylinder and said control valve, said flow path including a flow restricting orifice.

13. The brake system of claim 10 wherein said first master cylinder is hydraulically coupled with said pressure control to sense said braking force on the front wheel from said second master cylinder above a first value.

14. The brake system of claim 13 wherein said pressure control is located in said first master cylinder.

15. The brake system of claim 13 wherein said pressure control includes a pressure transducer hydraulically coupled with said second master cylinder and said restraining means includes a control valve responsive to said transducer and located in hydraulic communication between said first master cylinder and said rear wheel brake actuator.

16. The brake system of claim 10 wherein said restraining means further provides, when said first master cylinder is actuated during actuation of said second master cylinder, a third rate of increase of a ratio of braking force applied to said front wheel and breaking force applied to said rear wheel, lower than said second rate of increase, when braking force on the front wheel is above a third value.

17. A brake system for a motorcycle having front and rear wheels, comprising:

a first master cylinder;

a second master cylinder;

a first front wheel brake actuator hydraulically coupled to said first master cylinder;

a second front wheel brake actuator hydraulically coupled to said second master cylinder;

a first rear wheel brake actuator;

a first pressure control hydraulically coupled to said first master cylinder and to said rear wheel brake actuator having restraining means providing, when said first master cylinder is actuated during actuation of said second master cylinder, a first rate of increase of a ratio of braking force applied to said rear wheel and braking force applied to said front wheel and a second, lower rate of increase of a ratio of braking force applied to said rear wheel and braking force applied to said front wheel when braking force on the front wheel is above a first value.

18. The brake system of claim 17 wherein said restraining means provides, when said first master cylinder is actuated during actuation of said second master cylinder, a third rate of increase of a ratio of braking force applied to said rear wheel and braking force applied to said front wheel, lower than said second rate of increase, when braking force on the front wheel is above a second value.

19. The brake system of claim 18 further comprising a hand lever and a foot pedal, said hand lever being coupled to operate said second master cylinder and said foot pedal being coupled to operate said first master cylinder.

20. The brake system of claim 17 further comprising a second pressure control and a mechanical servo hydraulically coupled with said first master cylinder, said mechanical servo being mounted to said first front wheel brake actuator to be actuated upon braking by said first front wheel brake actuator, a second rear wheel brake actuator coupled to said second pressure control, said second pressure control being hydraulically coupled to said mechanical servo.

21. The brake system of claim 20 wherein said mechanical servo includes a valved flow path between said first master cylinder and said second pressure control, said flow path including a flow restricting orifice.

* * * * *